US011039581B2

United States Patent
Davis

(10) Patent No.: US 11,039,581 B2
(45) Date of Patent: Jun. 22, 2021

(54) APPARATUS FOR USE WITH A VEHICLE TO REDUCE PLANT MATERIAL

(71) Applicant: Bandit Industries, Inc., Remus, MI (US)

(72) Inventor: Derrick Davis, Blanchard, MI (US)

(73) Assignee: Bandit Industries, Inc., Remus, MI (US)

(*) Notice: Subject to any disclaimer, the term of this patent is extended or adjusted under 35 U.S.C. 154(b) by 180 days.

(21) Appl. No.: 16/361,710

(22) Filed: Mar. 22, 2019

(65) Prior Publication Data

US 2019/0297791 A1 Oct. 3, 2019

Related U.S. Application Data

(60) Provisional application No. 62/651,433, filed on Apr. 2, 2018.

(51) Int. Cl.
*A01G 23/06* (2006.01)

(52) U.S. Cl.
CPC ................... *A01G 23/067* (2013.01)

(58) Field of Classification Search
CPC ..... A01G 23/06; A01G 23/067; E02F 3/3677; E02F 3/3681; E02F 3/3686; E02F 3/384; E02F 3/382
USPC .................................................. 414/686, 687
See application file for complete search history.

(56) References Cited

U.S. PATENT DOCUMENTS

| | | | | |
|---|---|---|---|---|
| 3,243,053 A | * | 3/1966 | Hanser .................... | E02F 3/382 212/245 |
| 4,307,991 A | * | 12/1981 | Bridwell ................. | E02F 3/384 414/687 |
| 4,960,359 A | * | 10/1990 | Lovitt, Jr. ............... | B66F 9/061 414/686 |
| 5,203,388 A | * | 4/1993 | Bowling .............. | A01G 23/067 144/24.12 |

(Continued)

OTHER PUBLICATIONS

The AC Media Group, Sealed Ball Bearing Advantages, Jun. 13, 2016, http://www.acmwriting.com/sealed-ball-bearings-advantages/ (Year: 2016).*

(Continued)

*Primary Examiner* — Matthew Katcoff
(74) *Attorney, Agent, or Firm* — Howard & Howard Attorneys PLLC

(57) ABSTRACT

An apparatus for use with a vehicle to reduce plant material includes a frame having first and second mounting brackets, a boom coupled to the frame and having first and second mounting plates, a drive assembly having a drive shaft, a cutting device rotatable with the drive shaft, a reinforcing member to support the boom, a first bearing assembly sandwiched between the first mounting bracket and the first mounting plate, and a second bearing assembly sandwiched between the second mounting bracket and the second mounting plate. Each bearing assembly has an exterior annular member, an interior annular member, and a rolling element disposed between the interior and exterior members. The rolling element permits movement of the exterior and interior members relative to one another to facilitate rotation of the mounting plate relative the mounting bracket to permit pivotal movement of the boom relative to the frame.

29 Claims, 24 Drawing Sheets

(56) References Cited

U.S. PATENT DOCUMENTS 9,462,759 B2 * 10/2016 Knipp .................... A01G 23/06
2016/0183481 A1 * 6/2016 Barreto ................ A01G 23/067
144/24.12

OTHER PUBLICATIONS

Rotek Incorporated, "Large-Diameter Anti-Friction Slewing Rings Catalog", http://www.rotek-inc.com/files/Rotek_84pgCat_FINAL_ViewOnly.pdf, 2010, 82 pages.

* cited by examiner

APPARATUS FOR USE WITH A VEHICLE TO REDUCE PLANT MATERIAL

CROSS REFERENCE TO RELATED APPLICATIONS

The subject application claims priority to and all the benefits of U.S. Provisional Application No. 62/651,433, filed on Apr. 2, 2018, the contents of which are expressly incorporated herein in their entirety.

FIELD OF THE DISCLOSURE

The present disclosure relates generally to an apparatus for use with a vehicle to reduce plant material.

BACKGROUND

Apparatuses for reducing plant material, such as a forestry mower or stump grinder, are often used for cutting and/or grinding plant material (such as tree roots, tree stumps, etc.) in the ground for purposes of reducing or removing the plant material from the ground. Many stump grinders include a boom supporting a cutting device, and rotation of the cutting device is typically driven by a drive shaft powered by a motor. The apparatus includes a frame, and the boom is pivotally mounted to the frame. During operation, the boom pivots relative to the frame as the cutting device cuts/grinds the plant material in the ground.

During repair or service, it may be required to disconnect the boom at the pivot point. In designs where the pivot joint or connection is formed utilizing a pin, removal of the pin to disconnect the boom from the frame can be difficult. Accordingly, there is a need for an improved design that operates well as a pivotal connection between the boom and the frame and is easy to disassemble to detach the boom from the frame.

SUMMARY

An embodiment of an apparatus for use with a vehicle to reduce plant material is disclosed. The apparatus comprises a frame having first and second mounting brackets extending from the frame and spaced from one another with the first and second mounting brackets collectively defining a pivot axis with the frame adapted to be coupled to the vehicle. The apparatus further comprises a boom having first and second boom segments with the first boom segment coupled to the frame and pivotal about the pivot axis. The first boom segment has first and second mounting plates with the first mounting plate positioned adjacent but spaced from the first mounting bracket and the second mounting plate positioned adjacent but spaced from the second mounting bracket. The apparatus further comprises a drive assembly coupled to the second boom segment and having a drive shaft rotatably mounted to the second boom segment, a cutting device mounted to the drive shaft and rotatable with the drive shaft for reducing the plant material as the cutting device contacts the plant material, a reinforcing member extending between the first and second mounting brackets to support the boom coupled to the frame, a first bearing assembly sandwiched between the first mounting bracket and the first mounting plate, and a second bearing assembly sandwiched between the second mounting bracket and the second mounting plate. The first bearing assembly has a first exterior annular member mounted to one of the first mounting bracket and the first mounting plate with the first exterior annular member having an inner surface defining a first exterior member opening with the pivot axis passing centrally through the first exterior member opening, a first interior annular member mounted to another one of the first mounting bracket and the first mounting plate with the first interior annular member having a peripheral surface facing the inner surface of the first exterior annular member, and a first rolling element disposed between the inner surface of the first exterior annular member and the peripheral surface of the first interior annular member to permit movement of the first exterior annular member and the first interior annular member relative to one another to facilitate rotation of the first mounting plate relative to the first mounting bracket about the pivot axis. The second bearing assembly has a second exterior annular member mounted to one of the second mounting bracket and the second mounting plate with the second exterior annular member having an inner surface defining a second exterior member opening with the pivot axis passing centrally through the second exterior member opening, a second interior annular member mounted to another one of the second mounting bracket and the second mounting plate with the second interior annular member having a peripheral surface facing the inner surface of the second exterior annular member, and a second rolling element disposed between the inner surface of the second exterior annular member and the peripheral surface of the second interior annular member to permit movement of the second exterior annular member and the second interior annular member relative to one another to facilitate rotation of the second mounting plate relative to the second mounting bracket about the pivot axis to permit the pivotal movement of the boom relative to the frame about the pivot axis.

Another embodiment of an apparatus for use with a vehicle to reduce plant material is disclosed. In this embodiment, the apparatus comprises a frame having a mounting bracket extending from the frame with the mounting bracket defining a pivot axis with the frame adapted to be coupled to the vehicle, a boom having first and second boom segments with the first boom segment coupled to the frame and pivotal about the pivot axis and the first boom segment having a mounting plate positioned adjacent but spaced from the mounting bracket, a drive assembly coupled to the second boom segment and having a drive shaft rotatably mounted to the second boom segment, a cutting device mounted to the drive shaft and rotatable with the drive shaft for reducing the plant material as the cutting device contacts the plant material, and a bearing assembly sandwiched between the mounting bracket and the mounting plate. The bearing assembly has an exterior annular member mounted to one of the mounting bracket and the mounting plate with the exterior annular member having an inner surface defining an exterior member opening with the pivot axis passing centrally through the exterior member opening, an interior annular member mounted to another one of the mounting bracket and the mounting plate with the interior annular member having a peripheral surface facing the inner surface of the first exterior annular member, and a rolling element disposed between the inner surface and the exterior annular member and the peripheral surface of the interior annular member to permit movement of the exterior annular member and the interior annular member relative to one another to facilitate rotation of the mounting plate relative to the mounting bracket about the pivot axis to permit the pivotal movement of the boom relative to the frame about the pivot axis.

BRIEF DESCRIPTION OF THE DRAWINGS

The advantages of the present disclosure will be readily appreciated as the same becomes better understood by reference to the following detailed description when considered in connection with the accompanying drawings. It is to be understood that the drawings are purely illustrative and are not necessarily drawn to scale. Additionally, various features of the apparatus are shown schematically or semi-schematically.

DETAILED DESCRIPTION

Referring now to the figures, wherein like numerals indicate corresponding parts throughout the several views, embodiments of an apparatus 100, 500 for use with a vehicle 10 to reduce plant material are shown and described. The vehicle 10 may be a track carrier, a truck, a trailer, a cart, and/or other transportable vehicle or system. The apparatus 100, 500 is coupled to the vehicle 10, and the vehicle 10 and apparatus 100, 500 together may be referred to as a stump grinder, a forestry mower or mulcher, or other system for efficiently and effectively removing or reducing (such as by cutting or grinding) plant material (such as tree stumps or other plant material) from the ground. It should be appreciated that the apparatus 100, 500 can be any type of cutting and/or grinding apparatus that can suitably cut, grind, or otherwise reduce any type of material, not limited to plant material.

Figure 1:
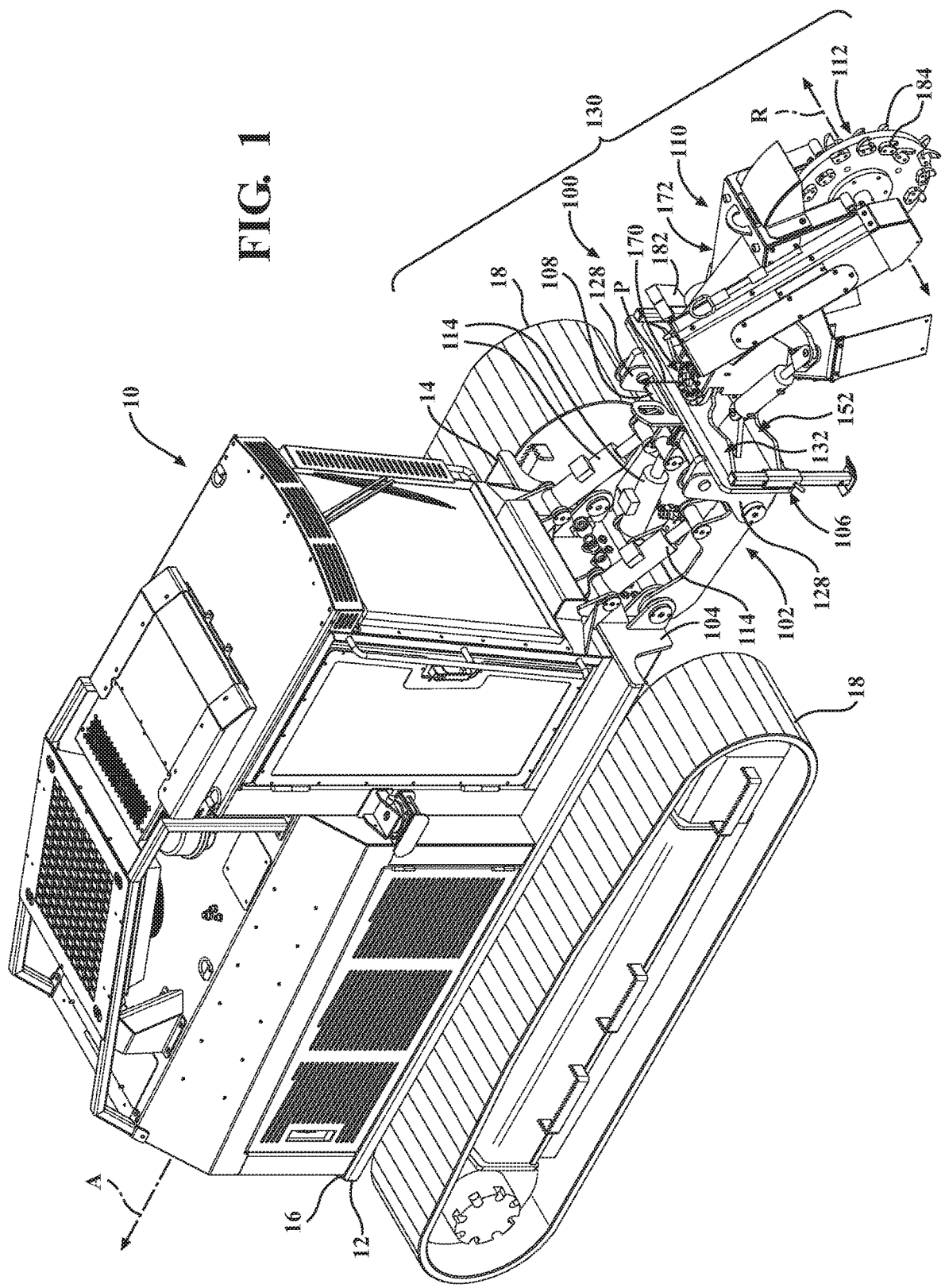
FIG. 1 is a perspective view of a vehicle including an apparatus for reducing plant material according to an embodiment of the present disclosure.
Figure 30:
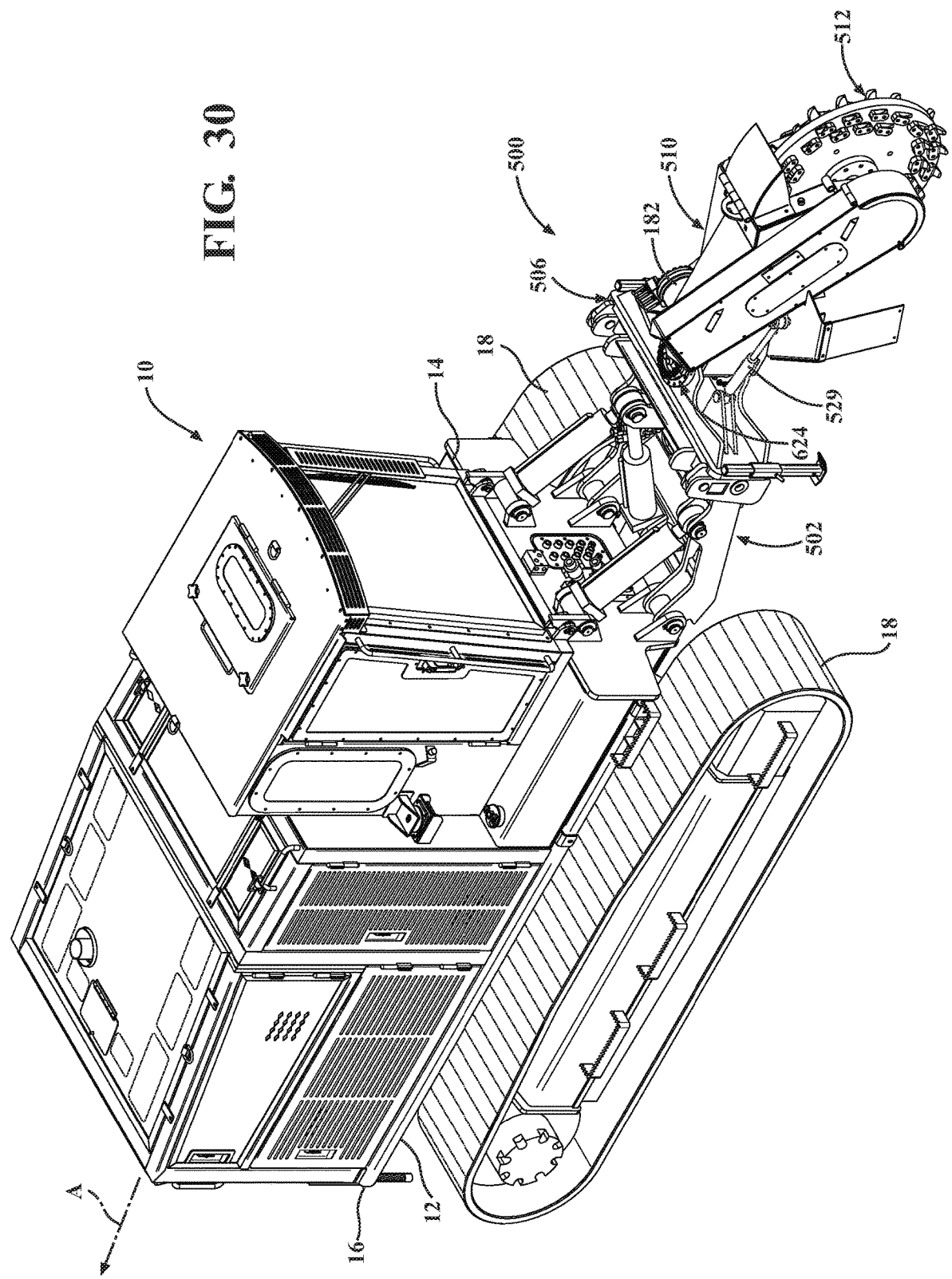
FIG. 30 is a perspective view of a vehicle including an apparatus for reducing plant material according to another embodiment of the present disclosure.
Figure 31:
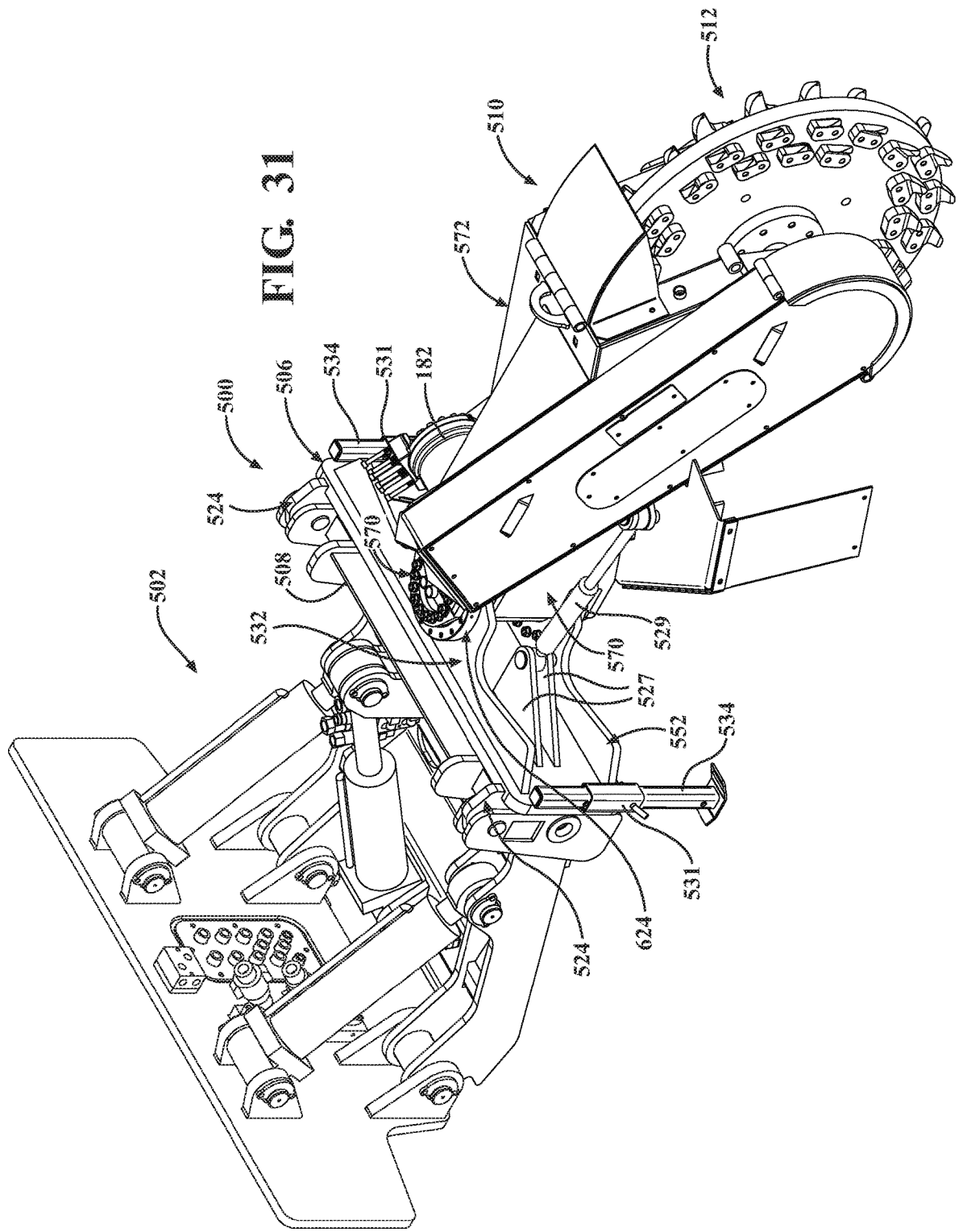
FIG. 31 is a perspective view of the apparatus of FIG. 30.
Figure 32:
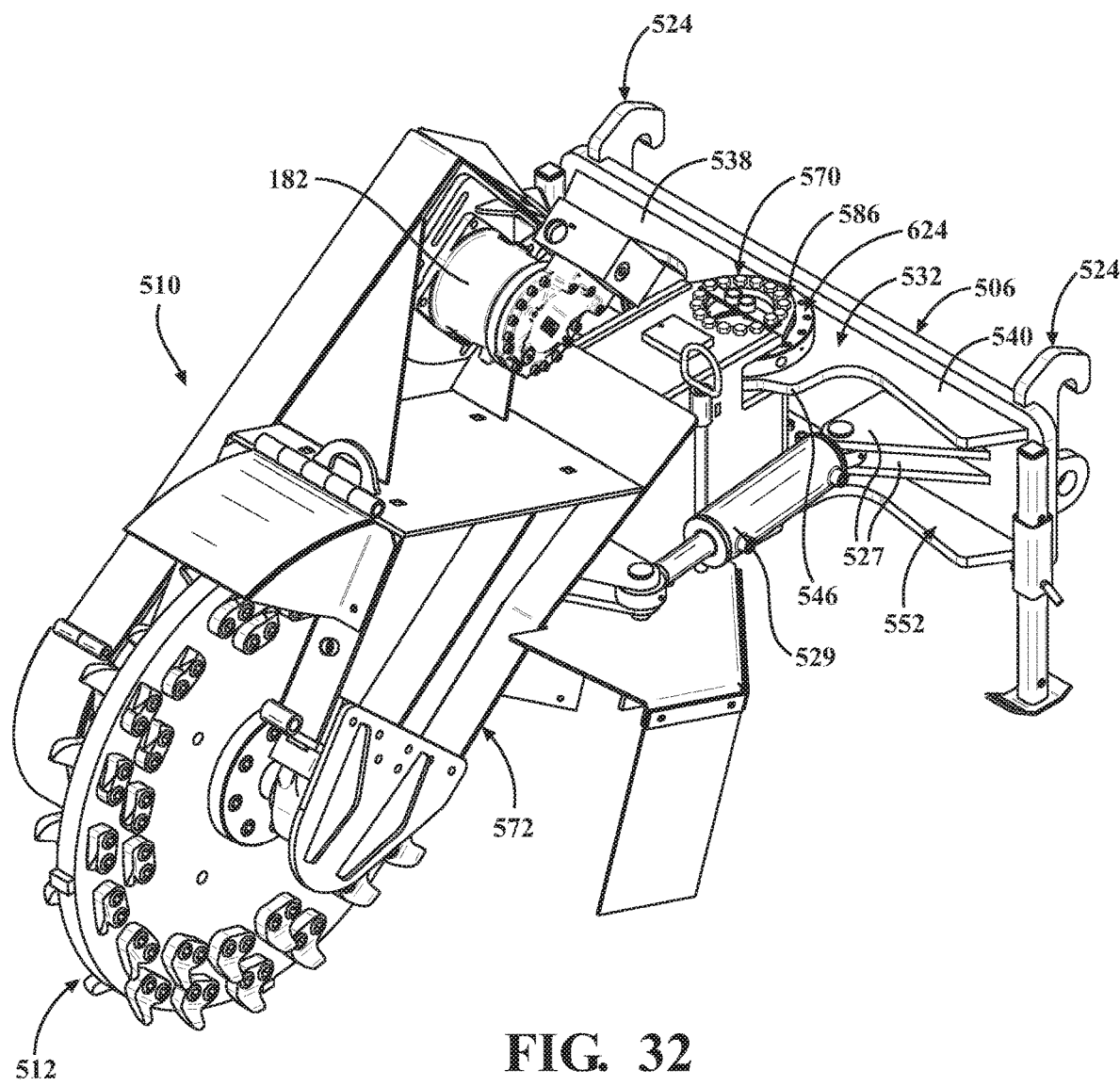
FIG. 32 is a perspective view of a portion of the apparatus of FIG. 30 including a frame, a boom coupled to the frame, drive assembly including a drive shaft, a cutting device mounted to the drive shaft, and bearing assemblies.
Figure 33:
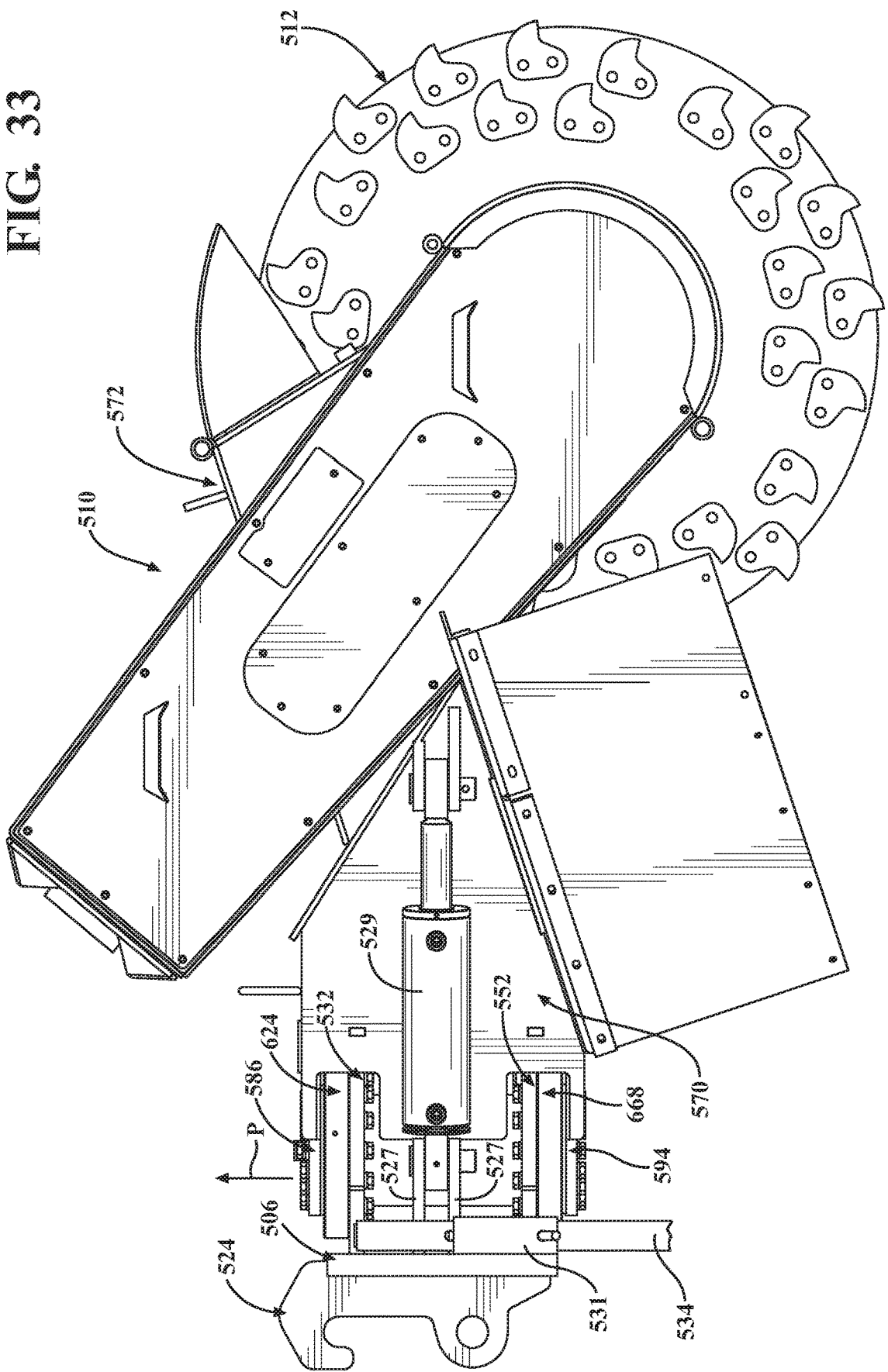
FIG. 33 is a side view of the portion of the apparatus of FIG. 32.
Figure 34:
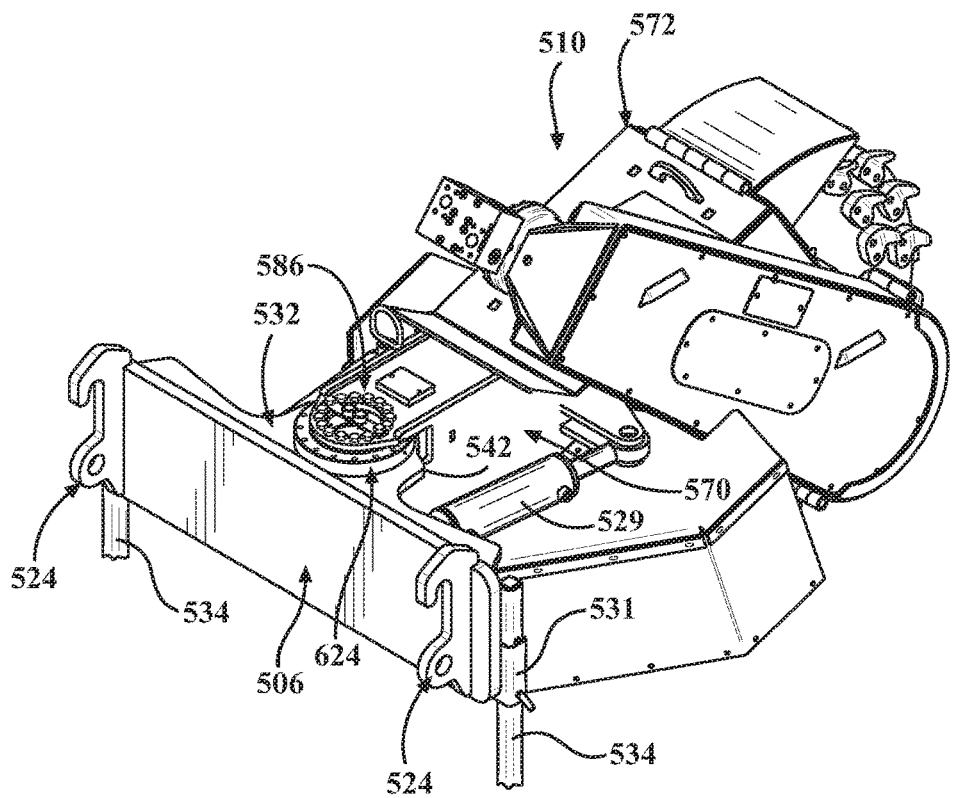
FIG. 34 is another perspective view of the portion of the apparatus of FIG. 32.
Figure 35:
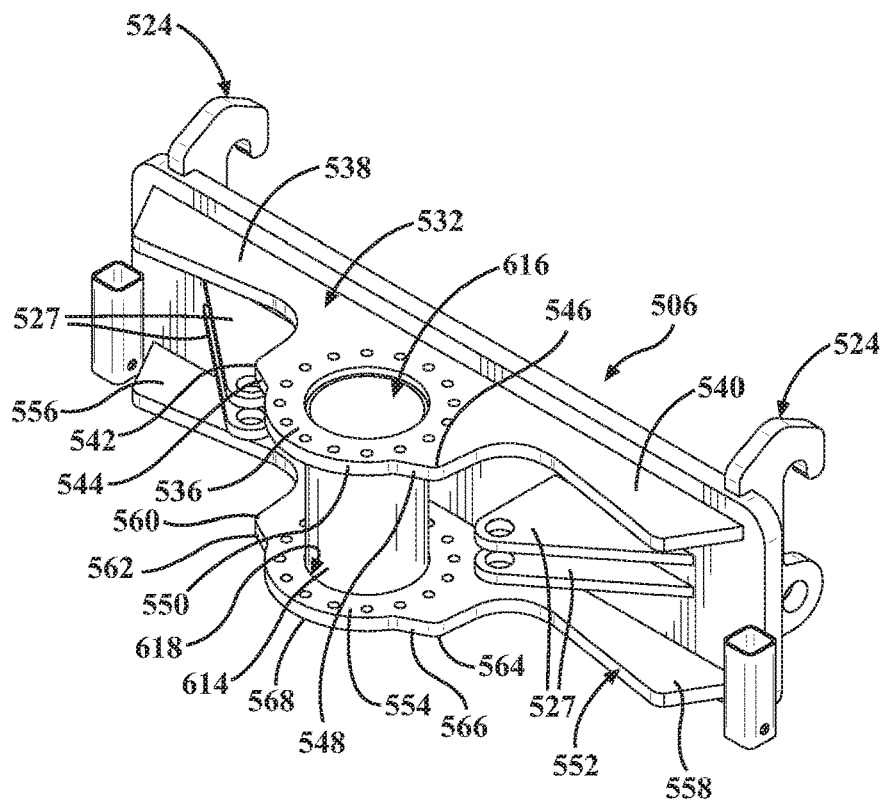
FIG. 35 is a perspective view of a segment of the portion of the apparatus of FIG. 32 including the frame.
Figure 36:
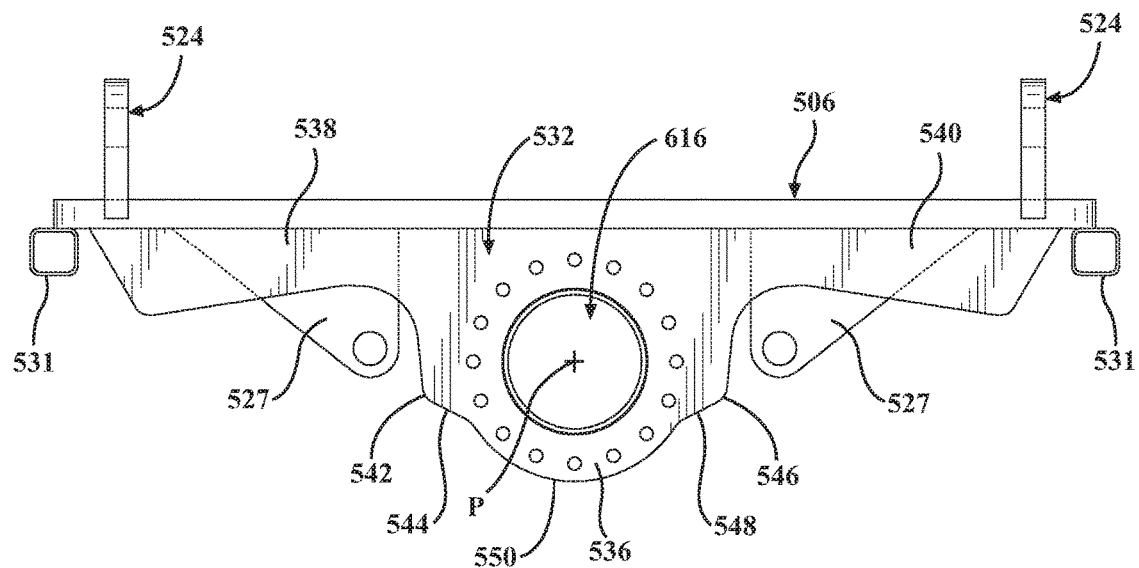
FIG. 36 is a top plan view of the segment of FIG. 35.
Figure 37:
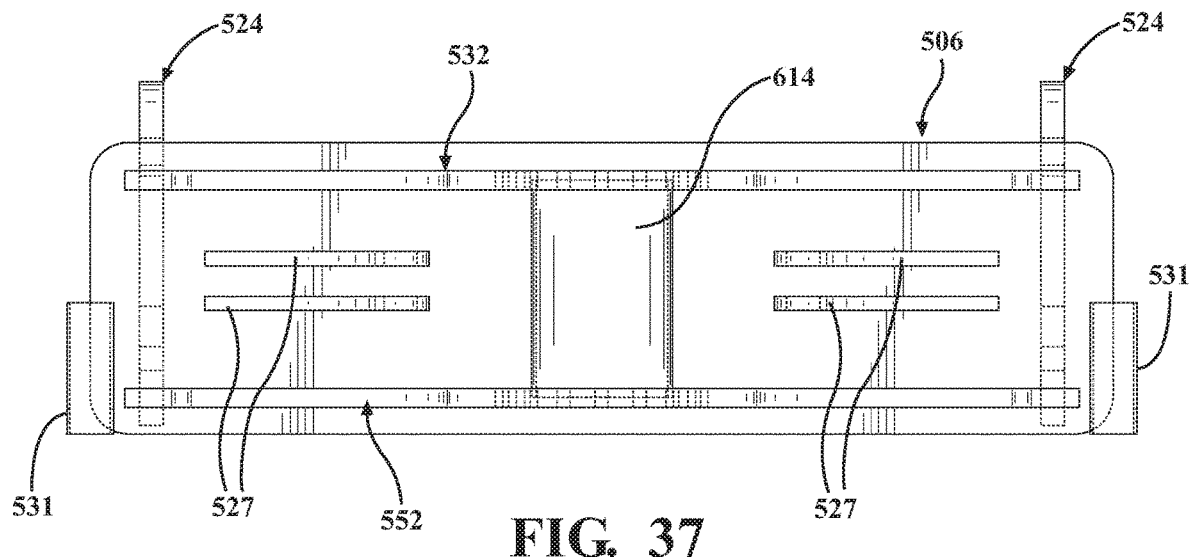
FIG. 37 is front view of the segment of FIG. 35.
Figure 38:
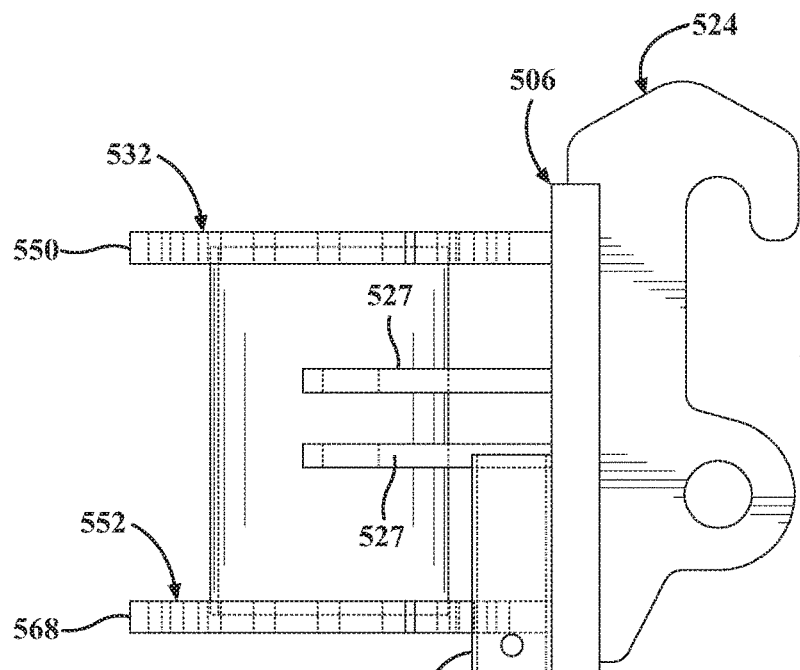
FIG. 38 is a side view of the segment of FIG. 35.
Figure 39:
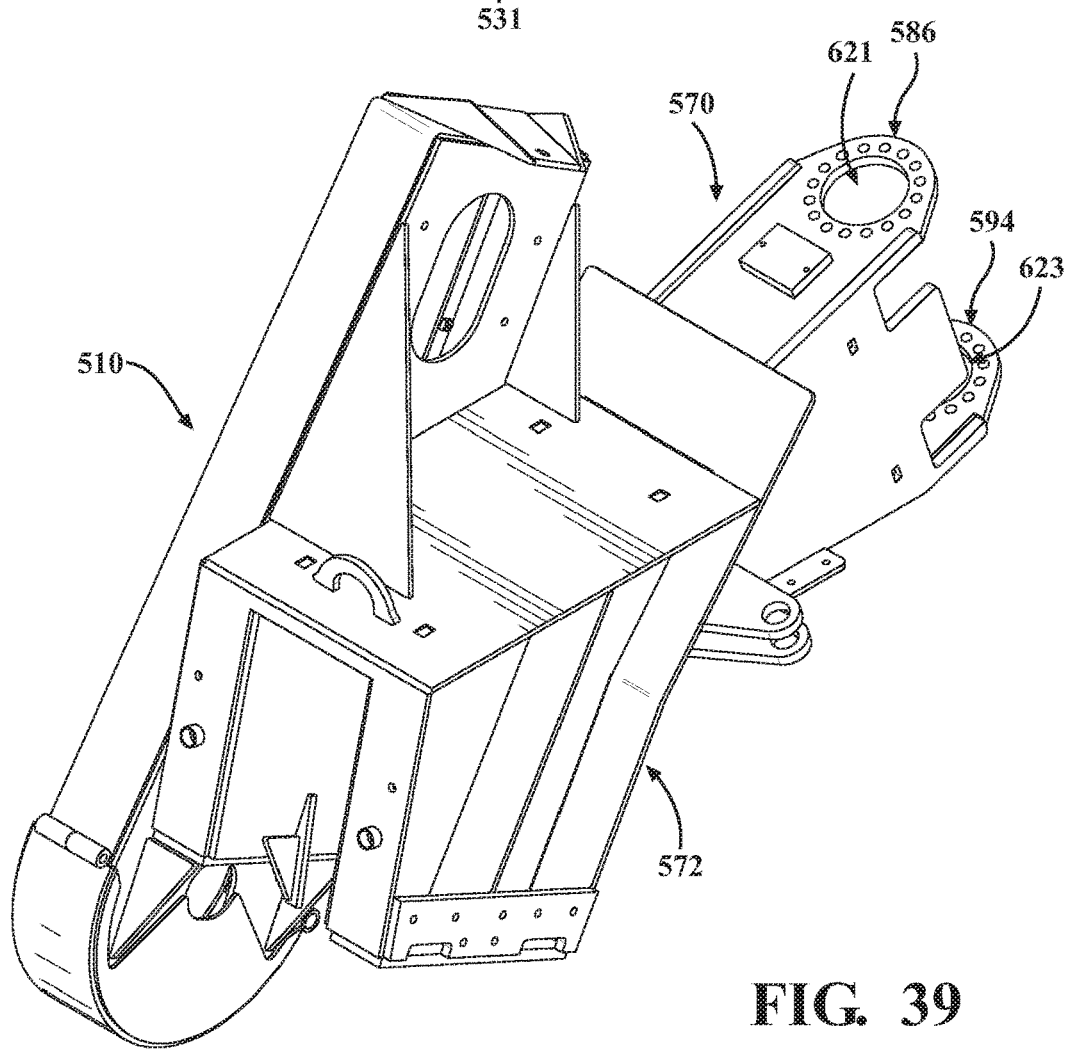
FIG. 39 is a perspective view of another segment of the portion of the apparatus of FIG. 32 including the boom.
Figure 40:
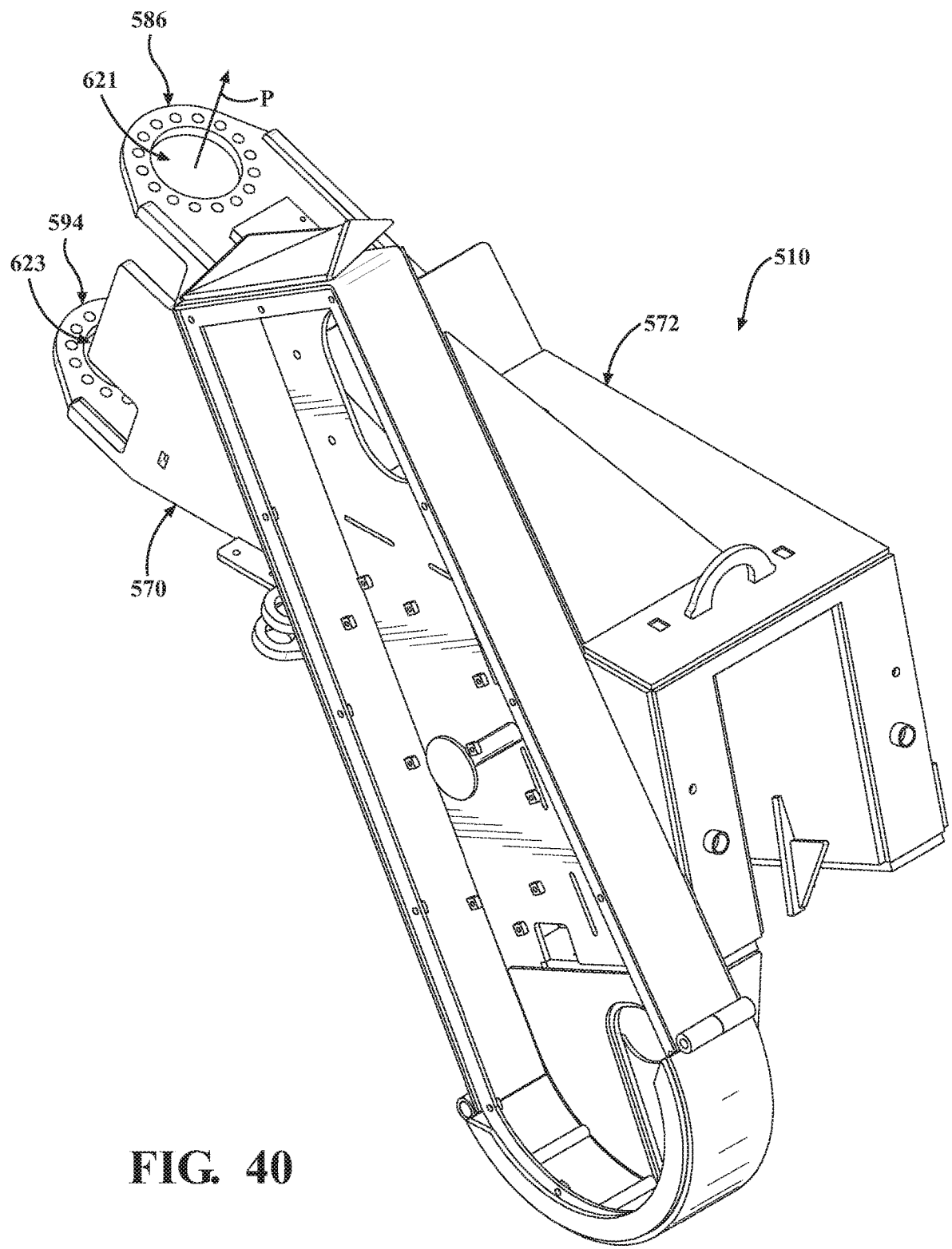
FIG. 40 is another perspective view of the segment of FIG. 39.
Figure 41:
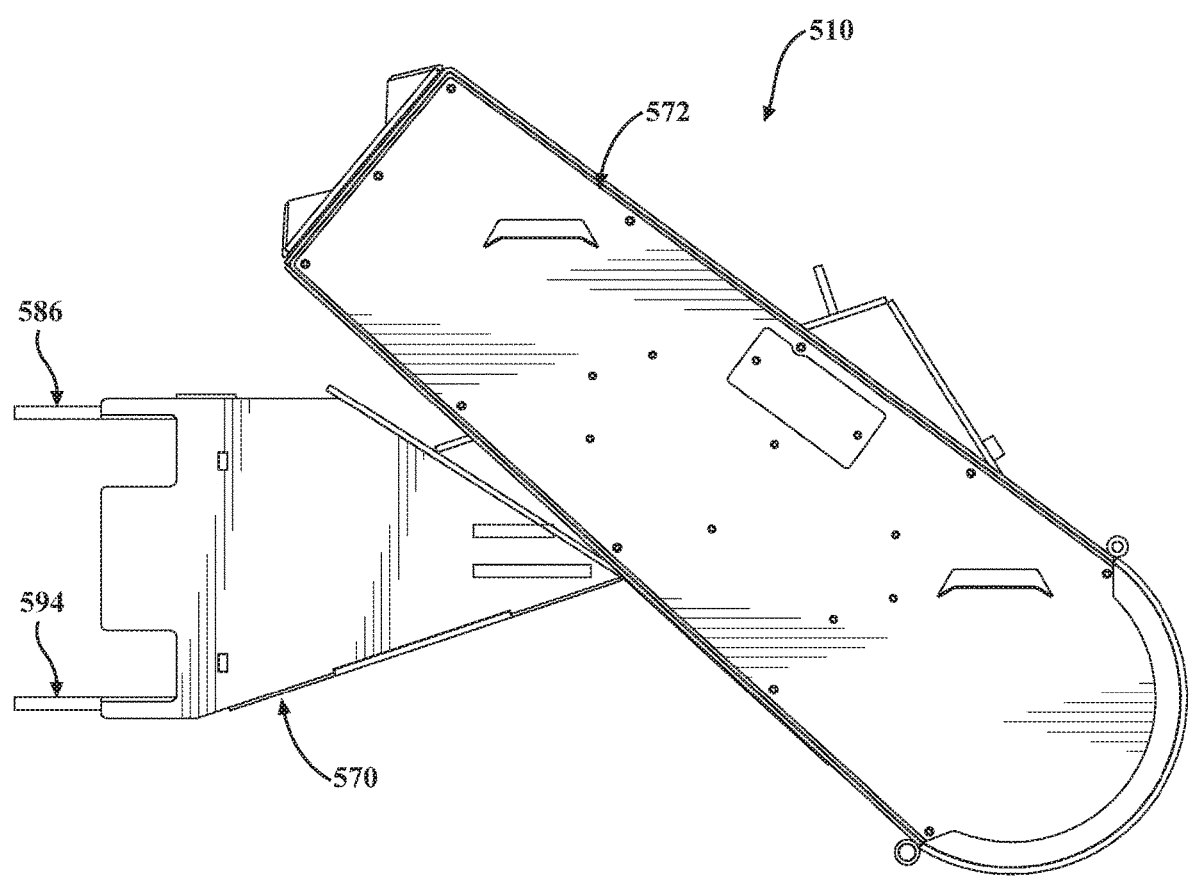
FIG. 41 is a side view of the segment of FIG. 39.

The vehicle 10 is illustrated in FIGS. 1 and 30 as a track carrier including a body 12 having front 14 and rear 16 ends and defining a longitudinal axis A. The body 12 may have any configuration, and may be formed or constructed from any suitable material or combination of materials. In a non-limiting example, the body 12 is formed from a metal, such as a steel. In the embodiment shown, the vehicle 10 has a plurality of axles supporting a continuous or caterpillar track 18 to enable the vehicle 10 to move along the ground from one position to another. Alternatively, the vehicle 10 could have at least one axle supporting at least one wheel to enable the vehicle 10 to move along the ground from one position to another. In another alternative embodiment, the vehicle 10 could be without axles and wheels, and the vehicle 10 would remain stationary when positioned, for example, on the ground.

Multiple embodiments of the apparatus 100, 500 are described below. In the embodiments described with reference to FIGS. 1-29, the apparatus 100 is adapted for certain cutting/grinding applications. In the embodiments described with reference to FIGS. 30-41, the apparatus 500 is adapted for other cutting/grinding applications.

Figure 2:
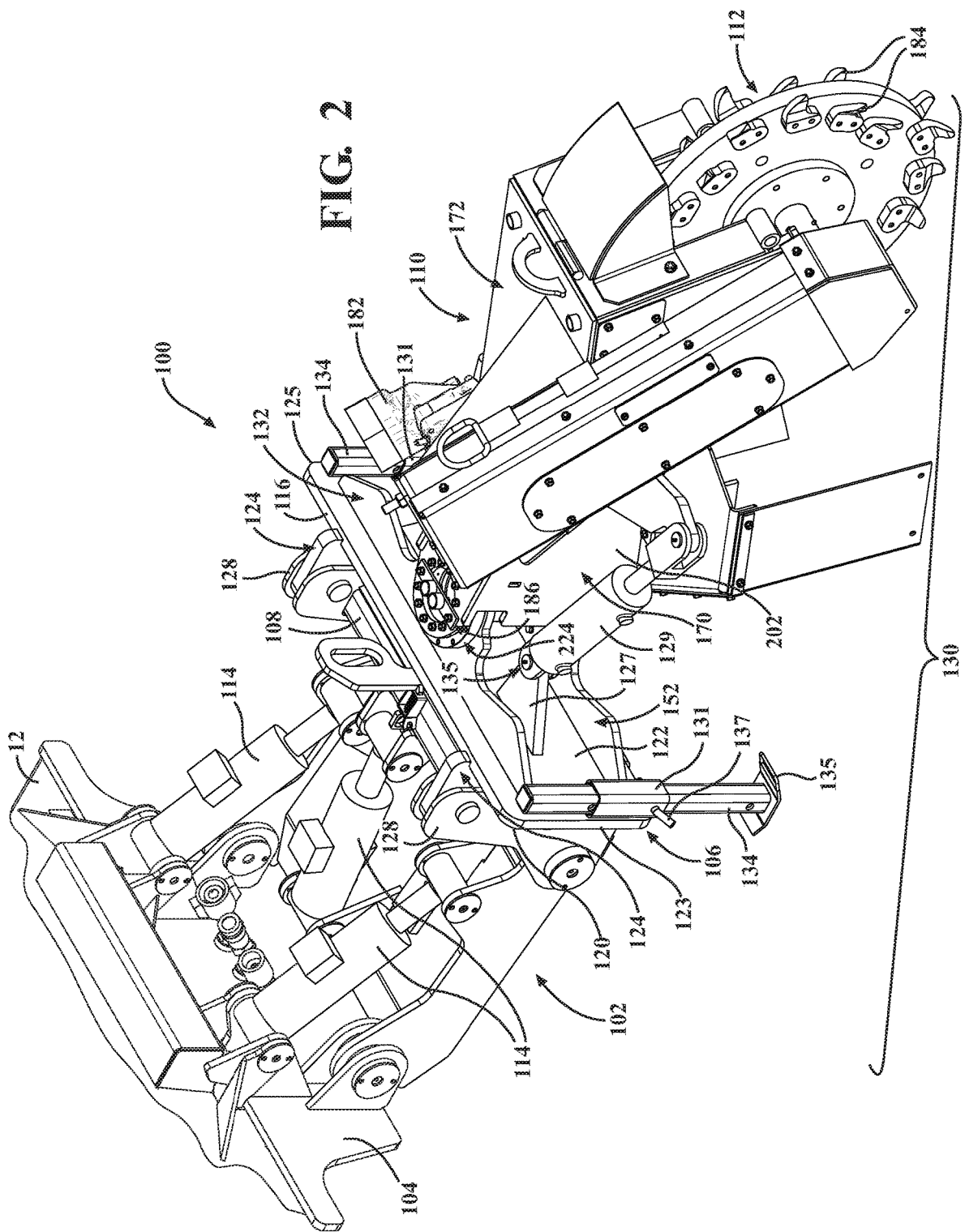
FIG. 2 is a perspective view of the apparatus of FIG. 1.
Figure 3:
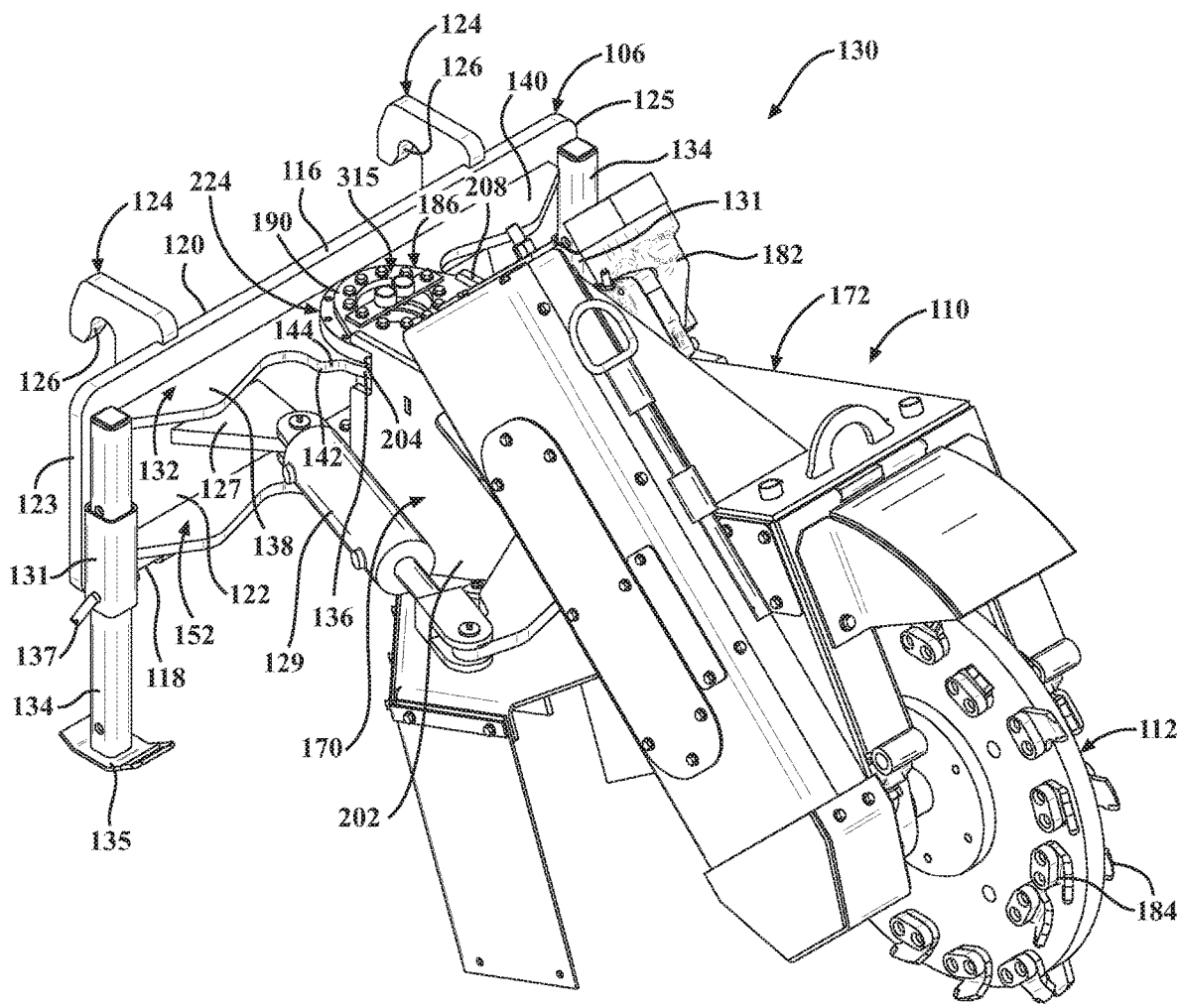
FIG. 3 is a perspective view of a portion of the apparatus of FIG. 1 including a frame, a boom coupled to the frame, drive assembly including a drive shaft, a cutting device mounted to the drive shaft, and bearing assemblies.

As shown in FIGS. 1 and 2, the apparatus 100 includes a lift mechanism 102 adapted to be mounted to the vehicle 10. The lift mechanism 102 includes a base 104 adapted to be mounted to the vehicle 10 and fixed in relation to the vehicle 10. In an embodiment, the base 104 is mounted to the body 12 of the vehicle 10 by any suitable means, such as welded or mechanically attached with fasteners or the like. When mounted to the body 102, the lift mechanism 102 moves with the body 12 of the vehicle 10 and not independently in relation to the body 12. Alternatively, the base 104 could be part of the body 12, and the lift mechanism 102 would be part of the vehicle 10 rather than part of the apparatus 100.

The apparatus 100 includes a frame 106 mounted to the lift mechanism 102. The lift mechanism 102 further includes an attachment plate 108 spaced from the base 104, and the frame 106 is mounted to the attachment plate 108. Details of the frame 106 and how the frame 106 is mounted to the attachment plate 108 are described below.

The apparatus further includes a boom 110 coupled to the frame 106 and a cutting device 112 mounted to the boom 110. The lift mechanism 102 is configured to move the frame 106 (with the boom 110 and the cutting device 112) upwards and downwards, such as during a cutting/grinding operation.

In an embodiment, the lift mechanism 102 includes at least one hydraulic actuator 114 mounted to the base 104 and to the frame 106, such as with one or more fasteners. The hydraulic actuator(s) 114 is configured to generate a hydraulic force to move the frame 106 (and thus the boom 110 and the cutting device 112) upwards and downwards. In the illustrated embodiment, the lift mechanism 102 has three hydraulic actuators 114; however, any appropriate number of hydraulic actuators 114 could be used. Additionally, it should be appreciated that other actuator(s) could be used, such as pneumatic actuators, to achieve the upwards and downwards movement of the frame 106 relative to the lift mechanism 102.

Details of the frame 106 are described below at least with reference to FIGS. 2-10. The frame 106 is adapted to be coupled to the vehicle 10. In the illustrated embodiment, and as previously mentioned, the frame 106 is mounted to the lift mechanism 102, which is mounted to the body 12 of the vehicle 10. The frame 106 has a top side 116, a bottom side 118 opposite the top side 116, and first 120 and second 122 opposing sides extending between the top 116 and bottom 118 sides. When the frame 106 is mounted to the lift mechanism 102, the first side 120 faces the attachment plate 108.

The apparatus 100 includes at least one fastening device 124 mounted to the frame 106. The at least one fastening device 124 defines a hook portion 126 extending from the first side 120 of the frame and adapted to mate with the attachment plate 108 to mount the frame 106 to the lift mechanism 102. For example, and as shown in FIGS. 1 and 2, the attachment plate 108 includes at least one bracket 128, and the hook portion 126 of the fastening device(s) 124 is received by/in the bracket 128 to mount the frame 106 to the attachment plate 108. The frame 106 is also removable from the lift mechanism 102, for example, by lifting the frame 106 to detach the hook(s) 126 from the bracket(s) 128. In this way, the segment 130 of the apparatus 100 (including the frame 106, the boom 110, and the cutting device 112) can be easily mounted to and removed from the vehicle 10 as a unit. This enables interchangeability of the segment 130 between a variety of vehicles and/or vehicle types.

The frame 106 further has at least one support bracket 131 mounted to the second side 122. The apparatus 100 further includes at least one adjustable stand 134 attached to and supported by the at least one support bracket 131. In the illustrated embodiment, the frame 106 has a support bracket 131 proximate each end 123, 125 of the frame 106, with each support bracket 131 configured to receive and support a stand 134. The stands 134 are configured to be seated against the ground to support the apparatus 100 in an upright position when the apparatus 100 is not in use. For example, each stand 134 has a foot 135, which is seated against the ground to support the apparatus 100 in the upright position. Additionally, each of the stands 134 is telescopically adjustable relative to the support bracket 131, and the stand 134 may be lengthened or shortened based on the relative topography of the surface or terrain of the location the apparatus 100 is positioned when not in use. The length of each stand 134 may be set by disposing a pin 137 through aligned apertures 139, 141 defined in the stand 134 and the support bracket 131, respectively. Additionally, the stands 134 can be shorted to a position of nonuse, where the foot 135 of each stand 134 is adjacent or abuts the support bracket 131 such that the stand 134 does not interfere with the cutting/grinding operation of the apparatus 100 when in use. Alternatively, the stands 134 can be removed when the apparatus 100 is in use.

The frame 106 has at least one cylinder bracket 127 extending from the second side 122 of the frame 106, with the cylinder bracket 127 defining an aperture 133. The apparatus 100 further includes at least one hydraulic cylinder 129, with one end pivotally coupled to the at least one cylinder bracket 127 and the other end pivotally coupled to the boom 110. The hydraulic cylinder(s) 129 is configured to generate a hydraulic force to move the boom 110 from side to side during a cutting/grinding operation of the apparatus 100. In the illustrated embodiment, the frame 106 has two cylinder brackets 127 extending from the second side 122 and the apparatus has two hydraulic cylinders 129 pivotally coupled to a respective one of the cylinder brackets 127. Pivotal coupling of the hydraulic cylinders 129 to the respective cylinder bracket 127 and/or the boom 110 may be accomplished by any suitable means 135, such as with a clevis and pin assembly.

The frame 106 further has a mounting bracket 132 extending from the frame 106 with the mounting bracket 132 defining a pivot axis P. The mounting bracket 132 has a mounting portion 136 and a support leg 138 extending from the mounting portion 136. In an embodiment, the mounting bracket 132 has the mounting portion 136 and opposing first 138 and third 140 support legs extending from the mounting portion 136. The mounting portion 136, the first support leg 138, and the third support leg 140 abut the frame 106. In particular, the mounting portion 136, the first support leg 138, and the third support leg 140 abut the second side 122 of the frame 106. The first 138 and third 140 support legs may have any suitable configuration for distributing the load on the mounting bracket 132 at least from pivotal movement of the boom 110 relative to the frame 106.

The mounting bracket 132 has a first tab 142 disposed and transitioning between the mounting portion 136 and the first support leg 138 with the first tab 142 defining a first stop 144. The mounting bracket 132 further has a third tab 146 disposed and transitioning between the mounting portion 136 and the third support leg 140 with the third tab 146 defining a third stop 148. Each of the first 142 and third 146 tabs may have any suitable configuration and any suitable size. The stops 144, 148 are configured to contact the boom 110 to limit pivotal movement of the boom 110 relative to the frame 106 about the pivot axis P, as described below. Additionally, the mounting bracket 132 has a rounded section 150 disposed between the first 142 and third 146 tabs with the rounded section 150 defining a range of the pivotal movement of the boom 110 relative to the frame 106. The rounded section 150 is configured as being rounded to provide a suitable clearance between the mounting bracket 132 and the boom 110 so that the boom 110 can pivot freely without interfering with the mounting bracket 132. It should be appreciated that the rounded section 150 could have a different configuration so long as the boom 110 can pivot freely without interfering with the mounting bracket 132.

The mounting bracket 132 further defines a plurality of apertures 151 radially arranged about the pivot axis P. The mounting bracket 132 may have any number of apertures 151, and the spacing between adjacent apertures 151 may be the same or different. Each of the apertures 151 is adapted to receive a fastener for mounting a bearing assembly 224 to the mounting bracket 132. This is described in further detail below.

In an embodiment, the mounting bracket 132 is further defined as a first mounting bracket 132 and the frame 106 further includes a second mounting bracket 152. The first 132 and second 152 mounting brackets extend from the frame 106 and are spaced from one another, with the first 132 and second 152 mounting brackets collectively defining the pivot axis P. Additionally, the configuration and/or size of the first mounting bracket 132 is substantially the same as the configuration and/or size of the second mounting bracket 152. Alternatively, the configuration and/or size of the first 132 and second 152 mounting brackets could be different.

The mounting portion 136 is further defined as a first mounting portion 136 and the first mounting bracket 132 has the first mounting portion 136 and the first support leg 138 extending from the first mounting portion 136. The second mounting bracket 152 has a second mounting portion 154 and a second support leg 156 extending from the second mounting portion 154. In an embodiment, the second mounting bracket 152 has the second mounting portion 154 and opposing second 156 and fourth 158 support legs extending from the second mounting portion 154. The second mounting portion 154, the second support leg 156 and the fourth support leg 158 abut the frame 106. In particular, the second mounting portion 154, the second support leg 156, and the fourth support leg 158 abut the second side 122 of the frame 106. The second 156 and fourth 158 support legs may have any suitable configuration for distributing the load on the second mounting bracket 152 at least from the pivotal movement of the boom 110 relative to the frame 106.

The second mounting bracket 152 has a second tab 160 disposed and transitioning between the second mounting portion 154 and the second support leg 156 with the second tab 160 defining a second stop 162. The second mounting bracket 152 further has a fourth tab 164 disposed and transitioning between the second mounting portion 154 and the fourth support leg 158 with the fourth tab 164 defining a fourth stop 166. Each of the second 160 and fourth 164 tabs may have any suitable configuration and any suitable size. The stops 162, 166 are configured to contact the boom 110 to limit pivotal movement of the boom 110 relative to the frame 106 about the pivot axis P. In an embodiment, the first 142 and second 160 tabs have substantially the same configuration and/or shape, and the third 146 and fourth 164 tabs have substantially the same configuration and/or shape. The first 132 and second 152 mounting brackets are arranged such that the first tab 142 is aligned with the second tab 160 along the pivot axis P and the second tab 160 is aligned with the fourth tab 164 along the pivot axis P.

Additionally, the second mounting bracket 152 has a rounded section 168 disposed between the second 160 and fourth 164 tabs with the rounded section 168 defining a range of the pivotal movement of the boom 110 relative to the frame 106. The rounded section 168 is configured as being rounded to provide a suitable clearance between the second mounting bracket 152 and the boom 110 so that the boom 110 can pivot freely without interfering with the second mounting bracket 152. It should be appreciated that the rounded section 168 could have a different configuration so long as the boom 110 can pivot freely without interfering with the second mounting bracket 152.

The second mounting bracket 152 further defines a plurality of apertures 153 radially arranged about the pivot axis P. The second mounting bracket 152 may have any number of apertures 153, and the spacing between adjacent apertures 153 may be the same or different. Each of the apertures 153 is adapted to receive a fastener for mounting a second bearing assembly 268 to the second mounting bracket 152. This is described in further detail below.

Figure 6:
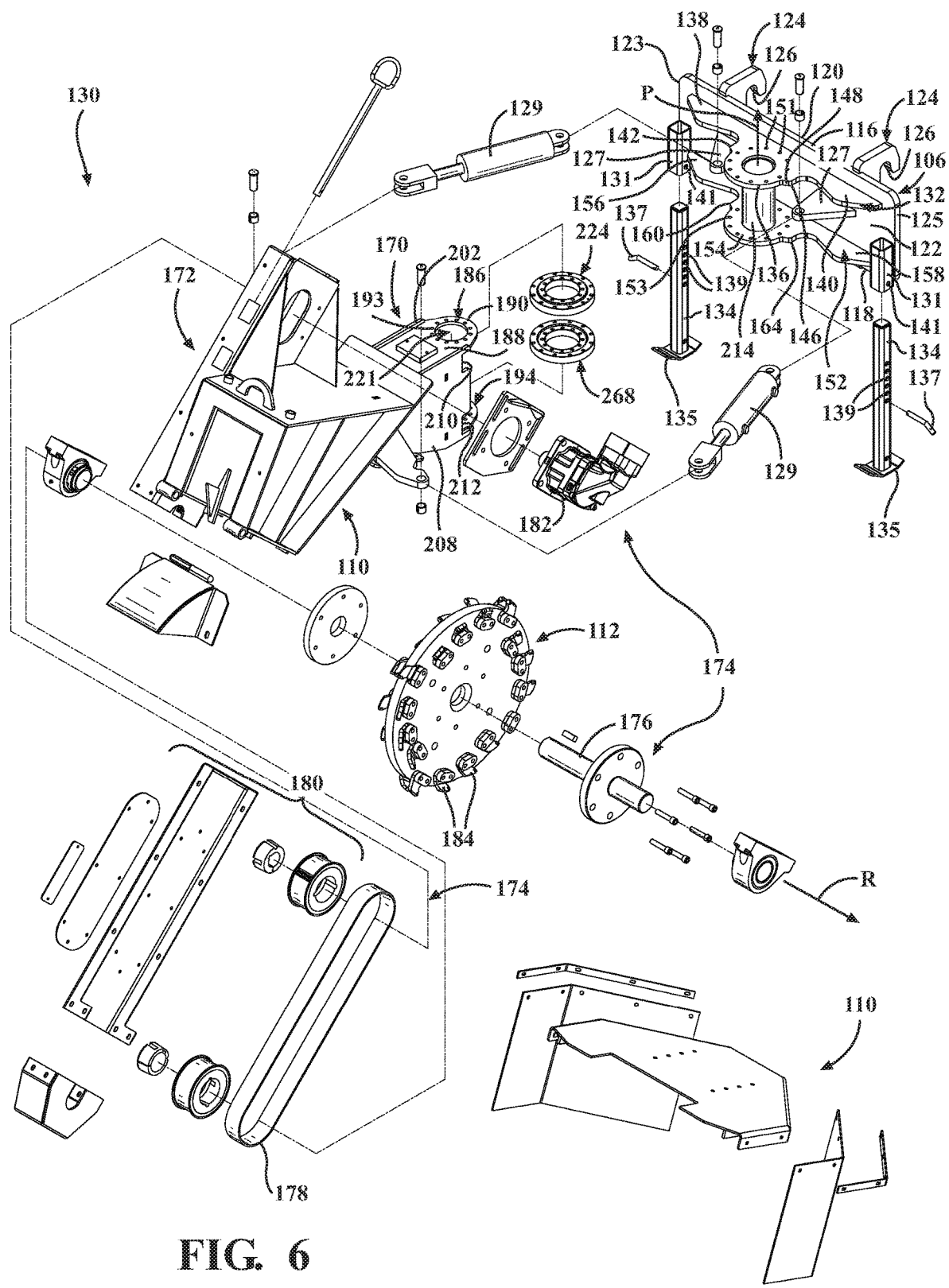
FIG. 6 is an exploded view of the portion of the apparatus of FIG. 3.
Figure 7:
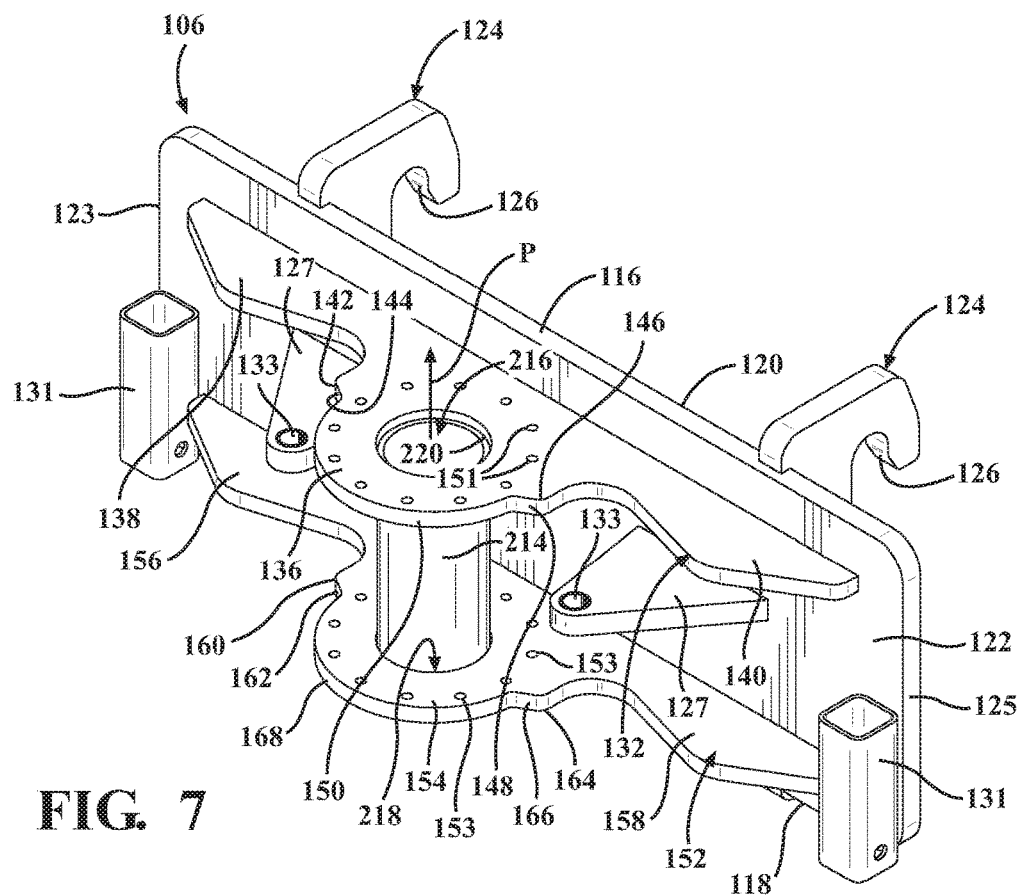
FIG. 7 is a perspective view of a segment of the portion of the apparatus of FIG. 3 including the frame.
Figure 8:
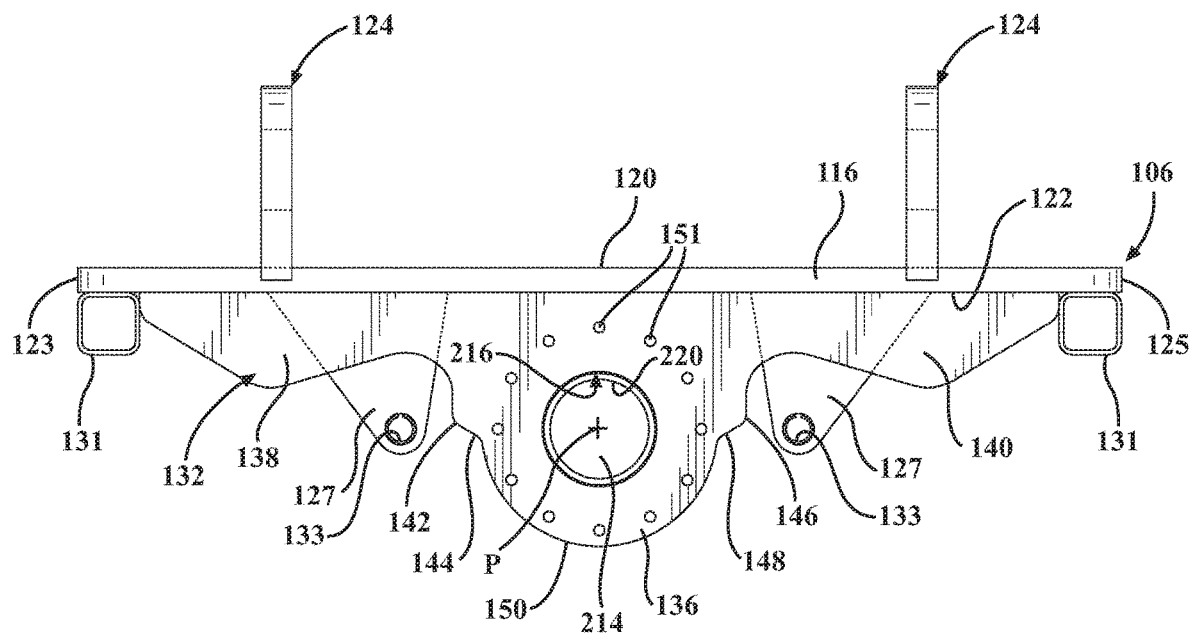
FIG. 8 is a top plan view of the segment of FIG. 7.
Figure 9:
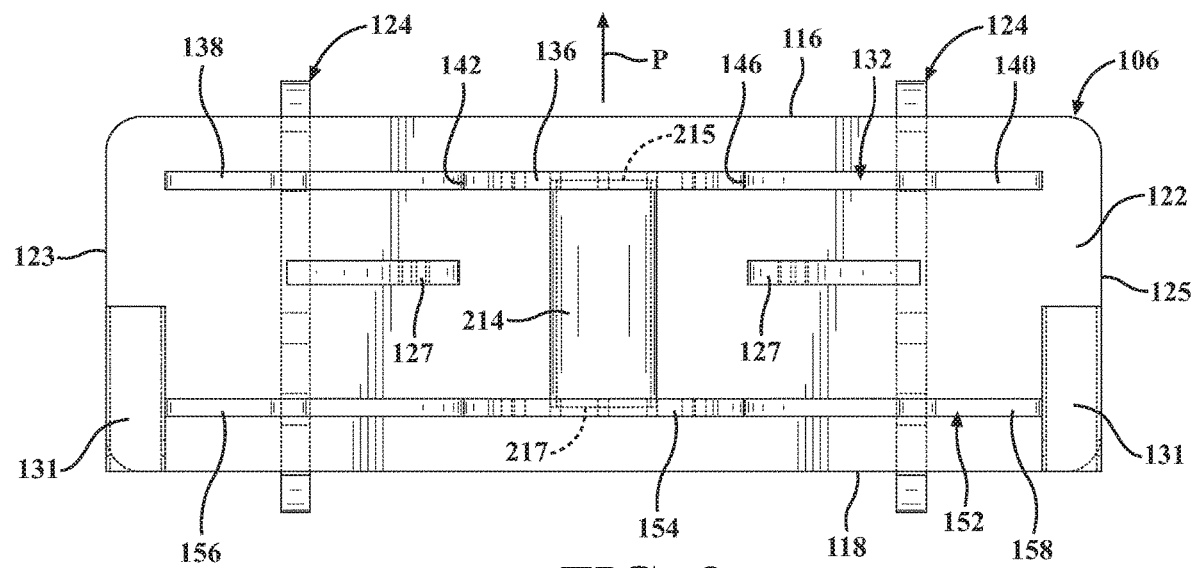
FIG. 9 is front view of the segment of FIG. 7.
Figure 10:
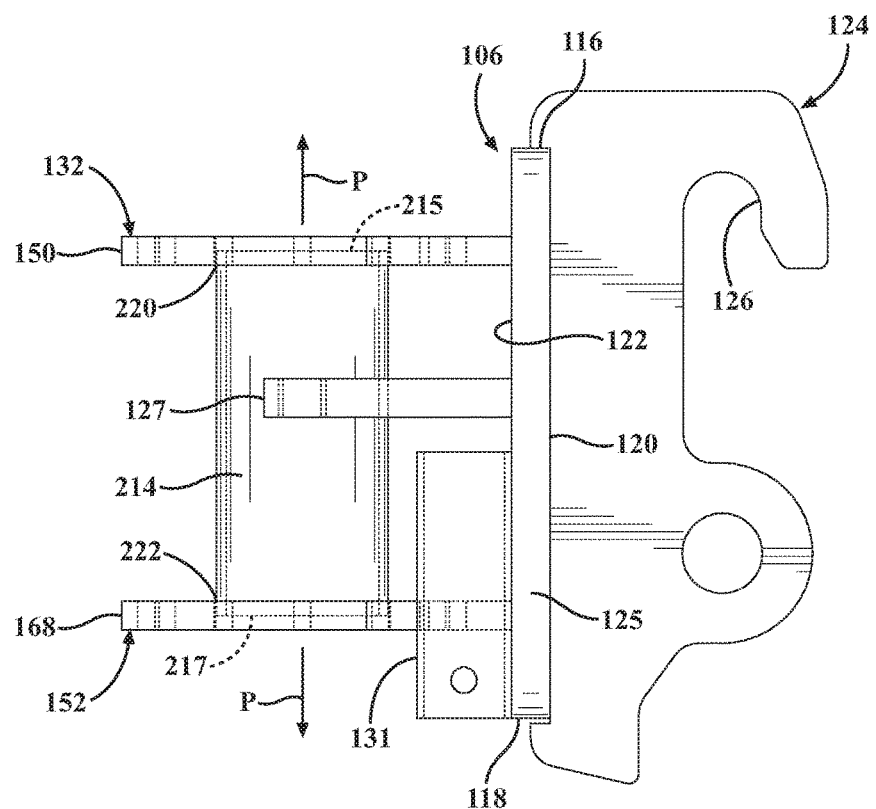
FIG. 10 is a side view of the segment of FIG. 7.

The apparatus 100 further has the boom 110, which is described in detail below with reference to FIGS. 1-6 and 11-15. The boom 110 has first 170 and second 172 boom segments with the first boom segment 170 coupled to the frame 106 and pivotal about the pivot axis P. The second boom segment 172 extends from the first boom segment 170 and is spaced from the frame 106. As best shown in FIG. 6, the apparatus 100 further includes a drive assembly 174 coupled to the second boom segment 172. The drive assembly 174 has a drive shaft 176 rotatably mounted to the second boom segment 172. In the illustrated embodiment, the drive assembly 174 is a belt drive system including a belt 178 mechanically linked to the drive shaft 176 through a pulley system 180. The drive assembly 174 further includes a drive motor 182, such a hydraulic motor or an electric motor, mounted to the second boom segment 172 and coupled to the belt 178. The drive motor 182 drives the belt 178, which effects rotation of the drive shaft 176 about a rotational axis R transverse to the longitudinal axis A.

Alternatively, the drive assembly 174 could have any suitable drive system including, but not limited to, hydraulic drive systems, power-take-off (PTO) systems, chain drive systems, and/or the like. In one or more of these alternative drive systems, the drive motor 182 could be coupled to and supported by the body 12 of the vehicle 10.

As shown in FIGS. 1-6, the apparatus 100 further includes the cutting device 112 mounted to the drive shaft 176 for reducing the plant material as the cutting device 112 contacts the plant material. In an embodiment, the cutting device 112 is further defined as a cutting wheel 112. The cutting wheel 112 is mounted to the drive shaft 176 about the rotation axis R, and is adapted to rotate about the rotational axis R relative to the boom 110. The cutting wheel 112 has a plurality of cutting elements 184 and while rotating, the cutting wheel 112 utilizes the cutting elements 184 to cut, grind, or otherwise reduce the plant material, such as a tree stump, when the cutting wheel 112 (and the cutting elements 184) contacts the plant material in the ground. Other configurations of the cutting device 112 are also contemplated, such as a cutting drum for a forestry mower for example.

Details of the first boom segment 170 are described below with reference at least to FIGS. 3-6 and 11-15. The first boom segment 170 has a mounting plate 186 positioned adjacent but spaced from the mounting bracket 132. The mounting plate 186 has a body portion 188 directly mounted to the second boom segment 172 and a mounting portion 190 extending from the body portion 188. The mounting portion 190 has a rounded section 192 defining a range of the pivotal movement of the boom 110 relative to the frame 106. In an embodiment, the rounded section 192 of the first mounting portion 190 of the first mounting plate 186 has the same configuration as the rounded section 150 of the first mounting portion 136 of the first mounting bracket 132. The mounting plate 186 further defines a plurality of apertures 193 radially arranged about the pivot axis P. The mounting plate 186 may have any number of apertures 193, and the spacing between adjacent apertures 193 may be the same or different. Each of the apertures 193 is adapted to receive a fastener for mounting the bearing assembly 224 to the mounting plate 186. This is described in further detail below.

In an embodiment, the mounting plate 186 is further defined as a first mounting plate 186 and the first boom segment 170 further has a second mounting plate 194 spaced from the first mounting plate 186. The first mounting plate 186 is positioned adjacent but spaced from the first mounting bracket 132 of the frame 106 and the second mounting plate 194 is positioned adjacent but spaced from the second mounting bracket 152 of the frame 106. The first 186 and second 194 mounting plates have substantially the same configuration.

The second mounting plate 194 has body portion 196 directly mounted to the second boom segment 172 and a mounting portion 198 extending from the body portion 196. The second mounting portion 198 has a rounded section 200 defining a range of the pivotal movement of the boom 110 relative to the frame 106. In an embodiment, the rounded section 200 of the second mounting portion 198 of the second mounting plate 194 has the same configuration as the rounded section 168 of the second mounting portion 154 of the second mounting bracket 152. In an embodiment, the first mounting portion 190 of the first mounting plate 186 is aligned with the second mounting portion 198 of the second mounting plate 194 along the pivot axis P. The second mounting plate 194 further defines a plurality of apertures 201 radially arranged about the pivot axis P. The second mounting plate 194 may have any number of apertures 201, and the spacing between adjacent apertures 201 may be the same or different. Each of the apertures 201 is adapted to receive a fastener for mounting the second bearing assembly 268 to the mounting plate 194, as described below.

The first boom segment 170 further has a support plate 202 extending from the first mounting plate 186. As shown, the support plate 202 extends between the first 186 and second 194 mounting plates. The first 144 and second 162 stops interact with the first boom segment 170, particularly, the support plate 202 to limit the pivotal movement of the boom 110 relative to the frame 106 about the pivot axis P. In an embodiment, the support plate 202 defines first 204 and second 206 notches with the first tab 142 disposed within the first notch 204 and the first stop 144 contacting the support plate 202 and the second tab 160 disposed within the second notch 206 and the second stop 162 contacting the support plate 202 to limit the pivotal movement of the boom 110 relative to the frame 106. The first 204 and second 206 notches may have any suitable configuration. In an embodiment, the first notch 204 has a first depth $d_1$ and the second notch 206 has a second depth $d_2$ substantially the same as the first depth $d_1$. Alternatively, the depths $d_1$ and $d_2$ could be different. If so, then the first 142 and second 160 tabs would also have different configurations such that both tabs 142, 160 would suitably interact with the support plate 202 to limit movement of the boom 110 relative to the frame 106.

In an embodiment, the support plate 202 is further defined as a first support plate 202 and the first boom segment 170 further has a second support plate 208 extending from the first mounting plate 186 and spaced from the first support plate 202. In the illustrated embodiment, each of the first 202 and second 208 support plates extend between the first 186 and second 194 mounting plates. The third 148 and fourth 166 stops interact with the first boom segment 170, particular, the second support plate 208 to limit the pivotal movement of the boom 110 relative to the frame 106 about the pivot axis P. In an embodiment, interaction of the first 144 and second 162 stops with the first support plate 202 and interaction of the third 148 and fourth 166 stops with the second support plate 208 occur substantially simultaneously.

The second support plate 208 defines third 210 and fourth 212 notches with the third tab 146 disposed within the third notch 210 and the third stop 148 contacting the second support plate 208 and the fourth tab 164 disposed within the fourth notch 212 and the fourth stop 166 contacting the second support plate 210 to limit the pivotal movement of the boom 110 relative to the frame 106. The third 210 and fourth 212 notches may have any suitable configuration. In an embodiment, the third notch has a third depth $d_3$ and the fourth notch 212 has a fourth depth $d_4$ substantially the same as the third depth $d_3$. Alternatively, the depths $d_3$ and $d_4$ could be different. If so, then the third 146 and fourth 164 tabs would also have different configurations such that both tabs 146, 164 would suitably interact with the support plate 208 to limit movement of the boom 110 relative to the frame 106. In another embodiment, the first $d_1$, second $d_2$, third $d_3$, and fourth $d_4$ depths are substantially the same. Alternatively, one or more of the first $d_1$, second $d_2$, third $d_3$, and fourth $d_4$ depths could be different than the remaining depths $d_1$, $d_2$, $d_3$, $d_4$.

The apparatus 100 further has a reinforcing member 214 extending between the first 186 and second 194 mounting plates of the first boom segment 170 to support the boom 110 coupled to the frame 106. In the illustrated embodiment, the reinforcing member 214 has a cylindrical configuration. Alternatively, the reinforcing member 214 could have a triangular configuration, a square configuration, a rectangular configuration, or any other suitable configuration. Additionally, the reinforcing member 214 may be hollow (defining a true cylinder) or solid (defining a rod).

The reinforcing member 214 has opposed first 215 and second 217 ends with first end 215 coupled to the first mounting bracket 132 and the second end 217 coupled to the second mounting bracket 152. In an embodiment, the ends 215, 217 are welded to the respective first 186 and second 194 mounting brackets. In this embodiment, and as shown, the first mounting bracket 132 defines a first bracket opening 216 and the second mounting bracket 152 defines a second bracket opening 218. Each of the first 216 and second 218 bracket openings has a circular configuration. A first weld 220 is formed between the first end 215 of the reinforcing member 214 and the first mounting bracket 132 inside the first bracket opening 216. A second weld 222 is formed between the second end 217 of the reinforcing member 214 and the second mounting bracket 152 inside the second bracket opening 218.

Figure 11:
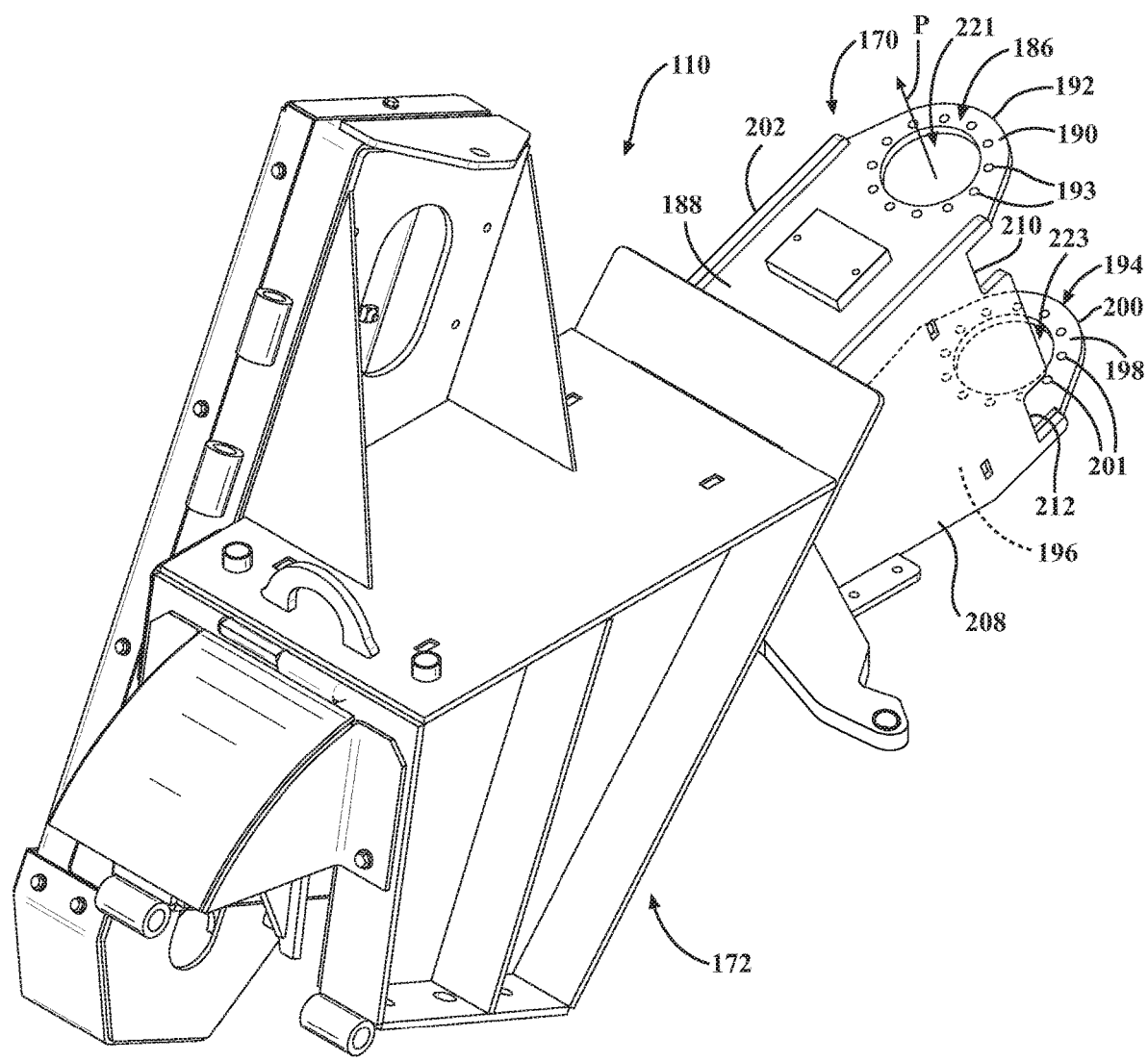
FIG. 11 is a perspective view of another segment of the portion of the apparatus of FIG. 3 including the boom.
Figure 12:
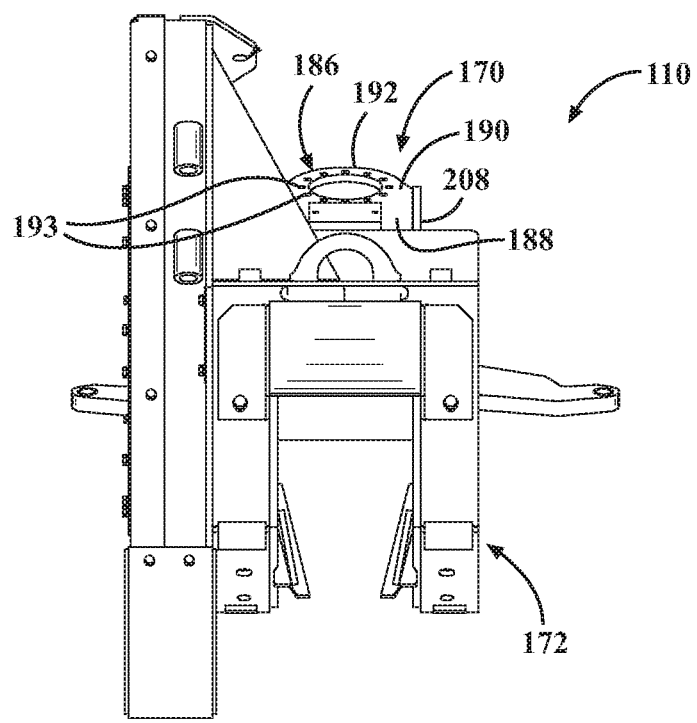
FIG. 12 is a front view of the segment of FIG. 11.
Figure 13:
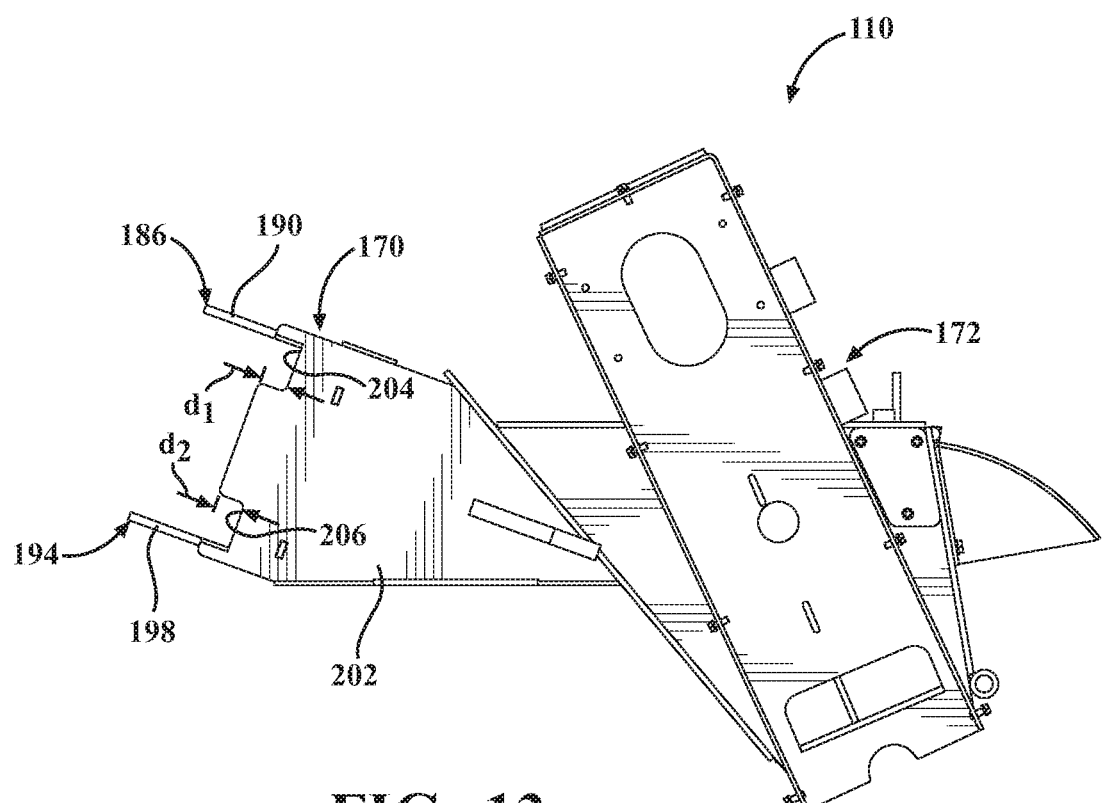
FIG. 13 is a left side view of the segment of FIG. 11.
Figure 14:
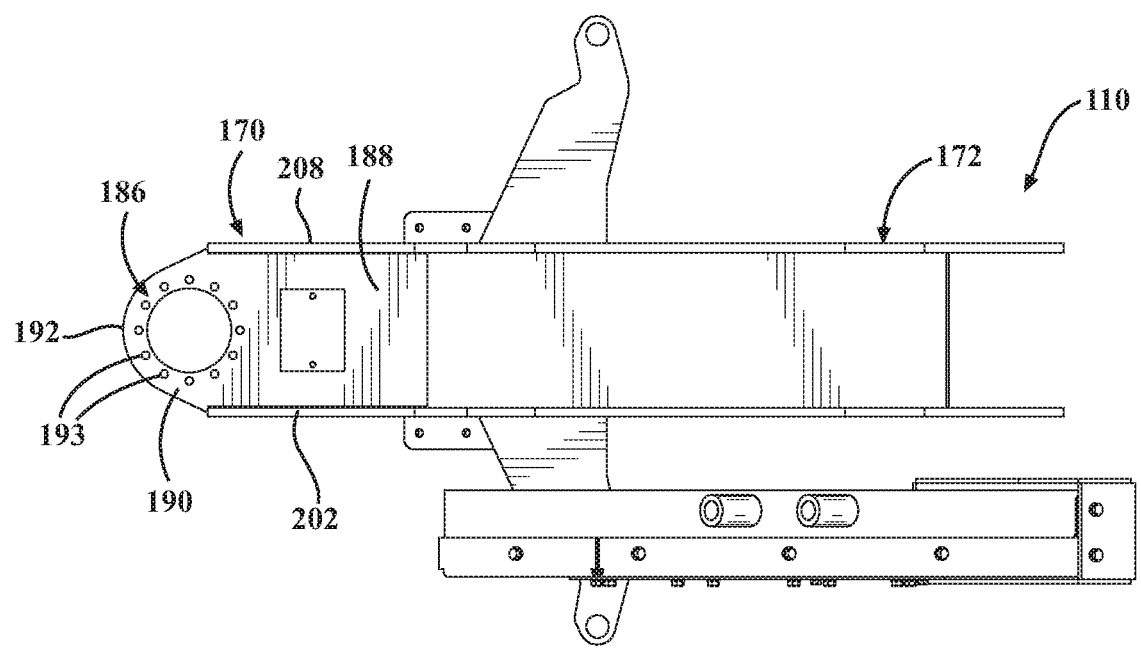
FIG. 14 is a top plan view of the segment of FIG. 11.
Figure 15:
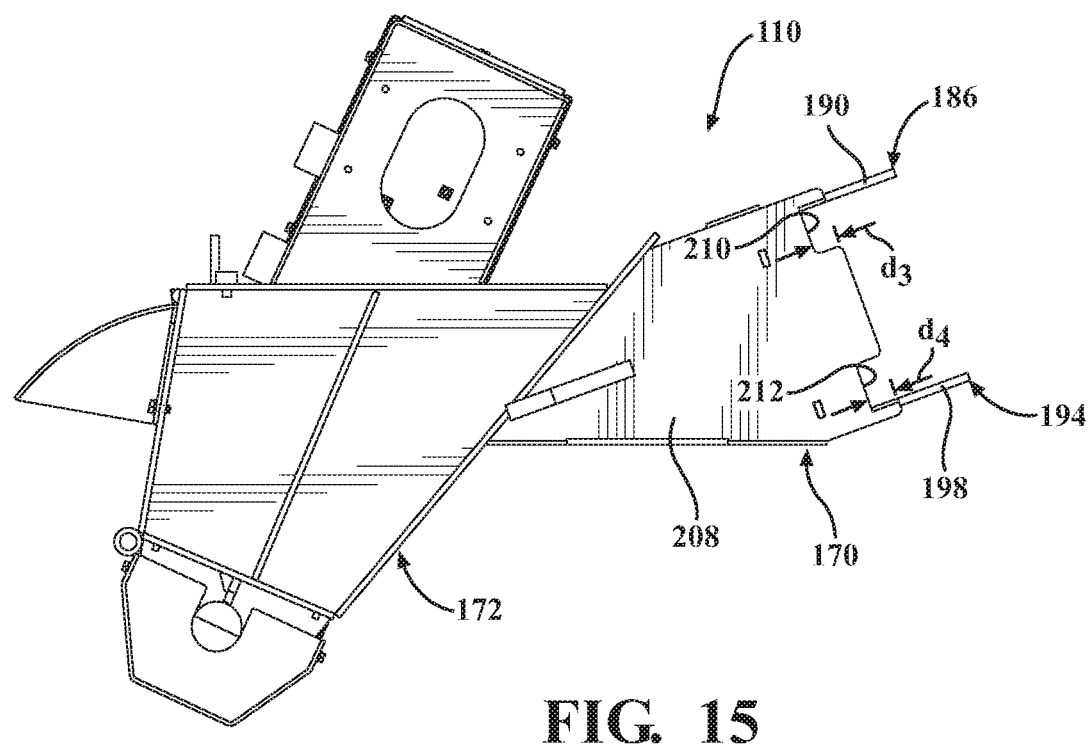
FIG. 15 is a right side view of the segment of FIG. 11.
Figure 16:
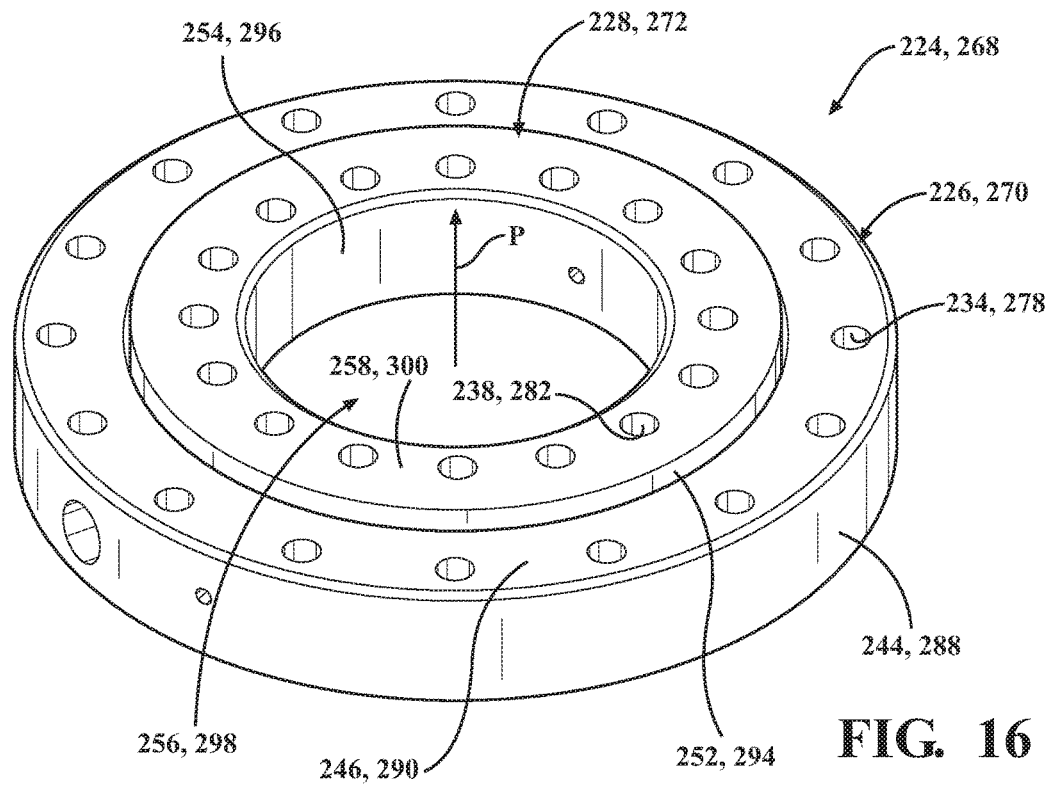
FIG. 16 is a perspective view of a bearing assembly of the apparatus of FIG. 3.
Figure 17:
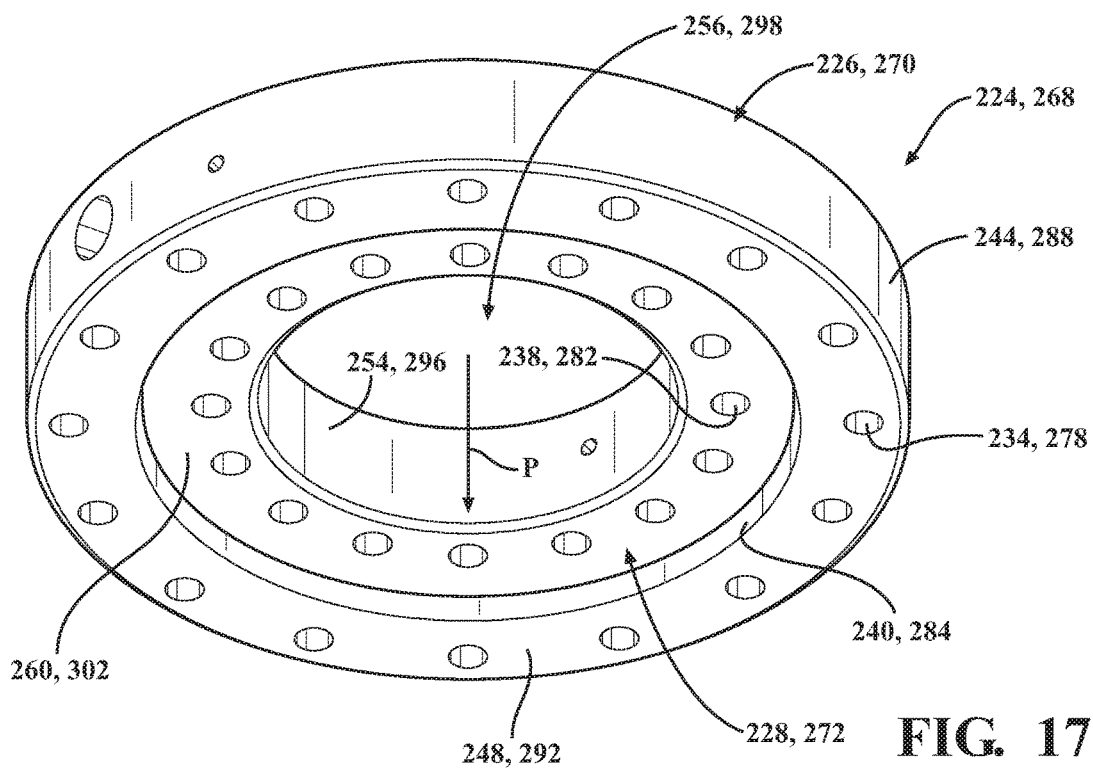
FIG. 17 is another perspective view of the bearing assembly of the apparatus of FIG. 3.
Figure 18:
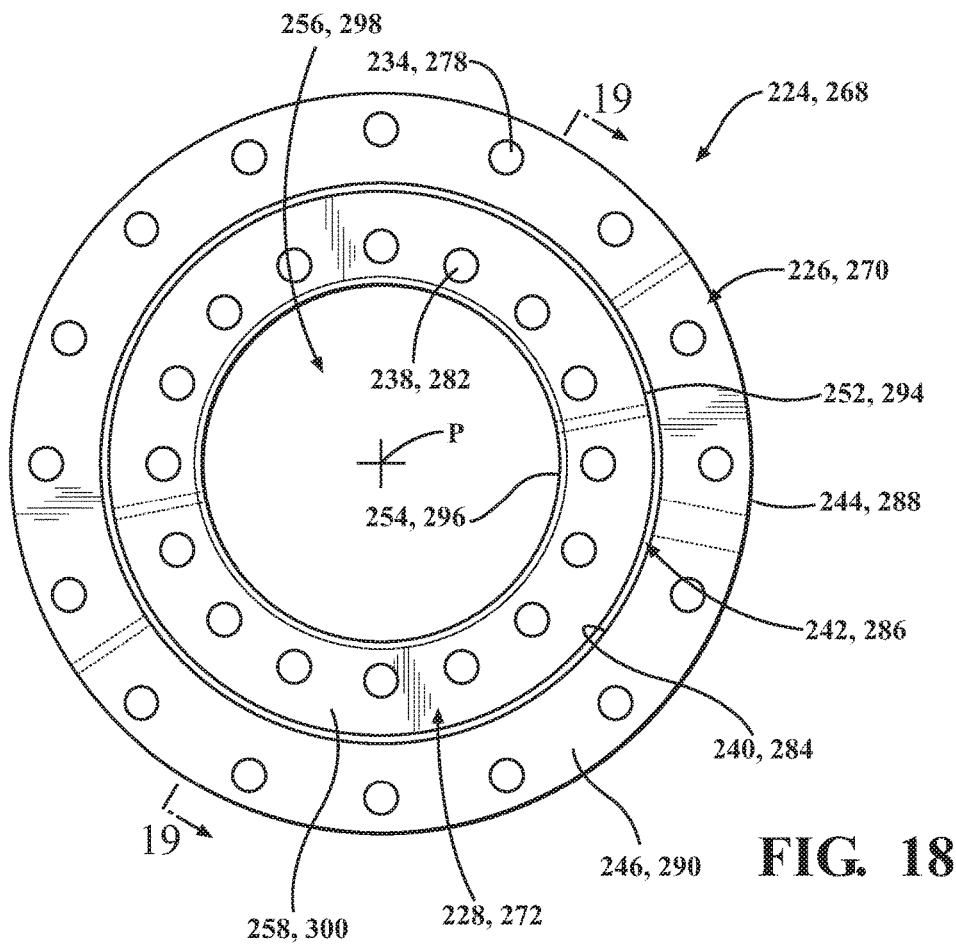
FIG. 18 is a top plan view of the bearing assembly of FIG. 16.

As shown at least in FIGS. 6 and 11, the first mounting plate 186 defines a first plate opening 221 and the second mounting plate 194 defines a second plate opening 223. Each of the first 221 and second 223 plate openings has a circular configuration. The first plate opening 221 is aligned with the first bracket opening 216, and the second plate opening 223 is aligned with the second bracket opening 218. Additionally, the first plate opening 221, the second plate opening 223, the first bracket opening 216, and the second bracket opening 218 are aligned with the reinforcing member 214 and the pivot axis P.

The apparatus 100 further has the bearing assembly 224 sandwiched between the mounting bracket 132 of the frame 106 and the mounting plate 186 of the first boom segment 170 of the boom 110. The bearing assembly 224 has an exterior annular member 226, an interior annular member 228, and a rolling element 230 disposed between the exterior 226 and interior 228 annular members. The bearing assembly 224 may be referred to as a slewing bearing.

In an embodiment, the bearing assembly 224 is further defined as a first bearing assembly 224 sandwiched between the first mounting bracket 132 and the first mounting plate 186. Additionally, the exterior annular member 226 is further defined as a first exterior annular member 226, and the interior annular member 228 is further defined as a first interior annular member 228. The first exterior annular member 226 is mounted to one of the first mounting bracket 132 and the first mounting plate 186, and the first interior annular member 228 is mounted to another one of the first mounting bracket 132 and the first mounting plate 186. In the illustrated embodiment, the first exterior annular member 226 is mounted to the first mounting bracket 132 of the frame 106, and the first interior annular member 228 is mounted to the first mounting plate 186 of the boom 110. It should be appreciated that the arrangement could be reversed, where the first exterior annular member 226 could be mounted to the first mounting plate 186 and the first interior annular member 228 could be mounted to the first mounting bracket 132.

The first bearing assembly 224 is mechanically mounted to the first mounting bracket 132 and the first mounting plate 186. For instance, and as shown at least in FIG. 4, the apparatus 100 includes a plurality of first fasteners 232 disposed through the first exterior annular member 226 and the first mounting bracket 132 to mount the first bearing assembly 224 to the first mounting bracket 132. The first exterior annular member 226 defines a plurality of apertures 234, and the first bearing assembly 224 is positioned such that each one of the apertures 234 of the first exterior annular member 226 is aligned with a respective one of the apertures 151 of the first mounting bracket 132. The first fasteners 232 are disposed through the pairs of aligned apertures 151, 234 to mount the first exterior annular member 226 to the first mounting bracket 132.

Figure 4:
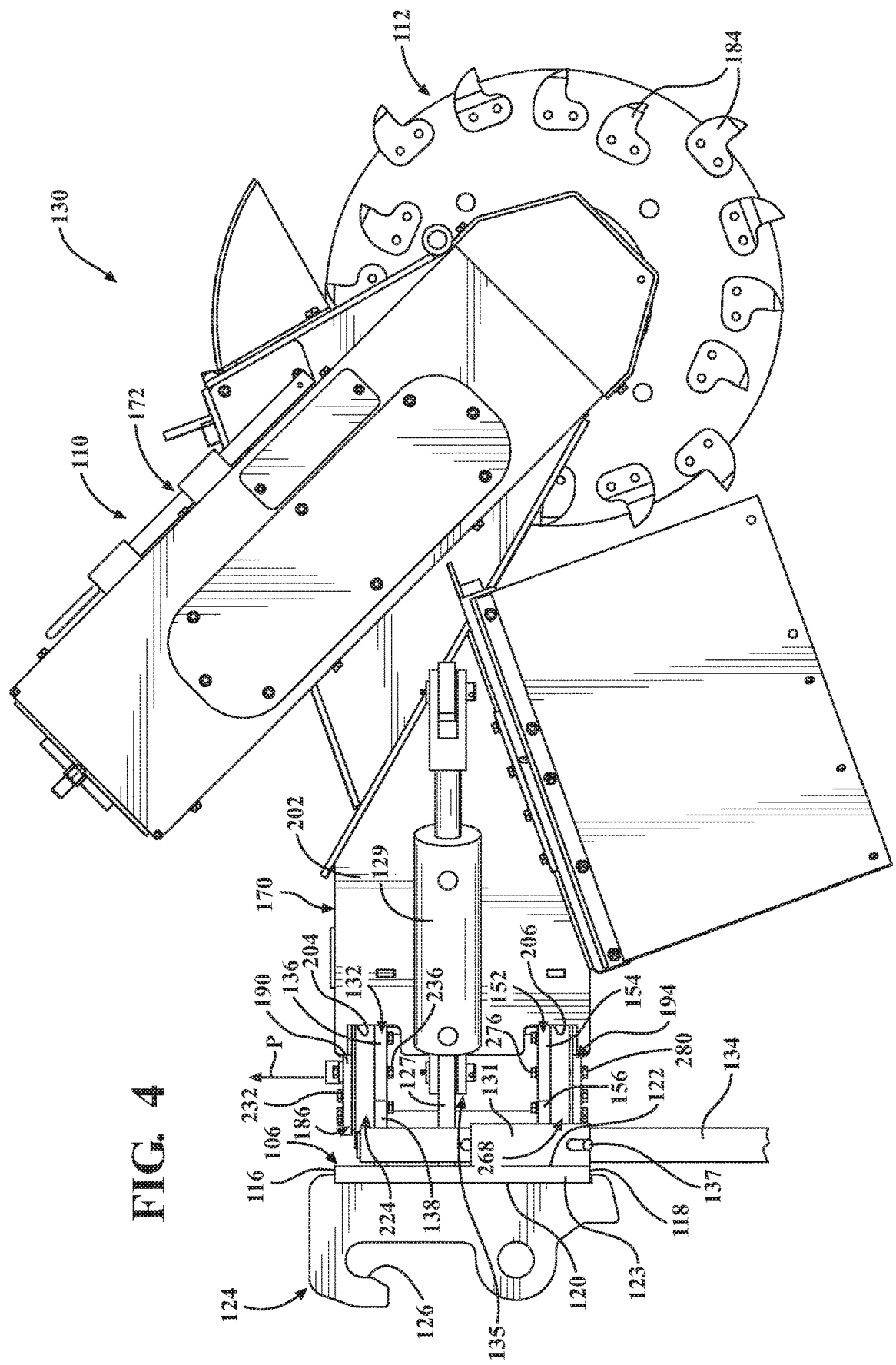
FIG. 4 is a side view of the portion of the apparatus of FIG. 3.
Figure 5:
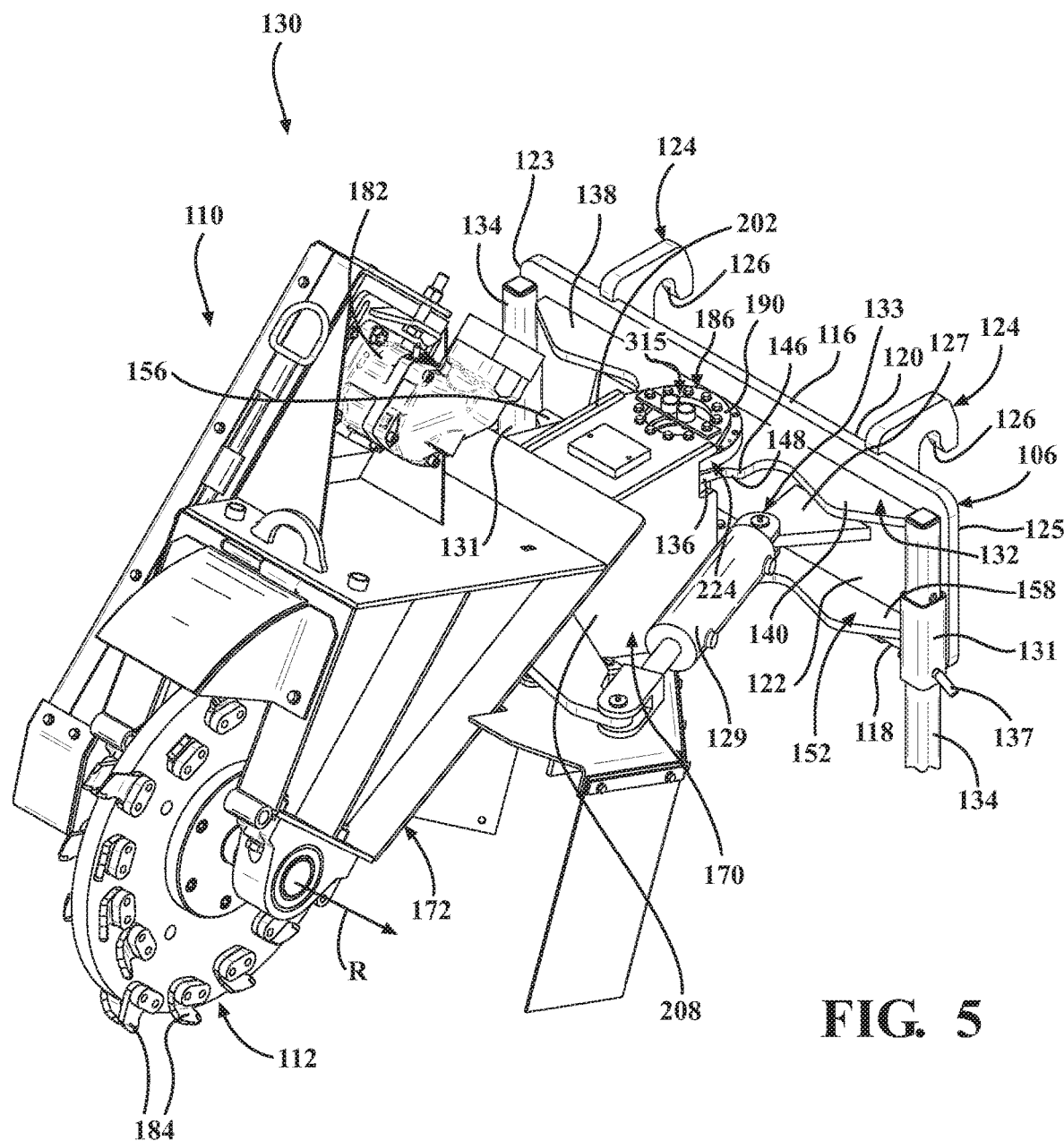
FIG. 5 is another perspective view of the portion of the apparatus of FIG. 3.

As also shown at least in FIG. 4, the apparatus 100 also includes a plurality of second fasteners 236 disposed through the first interior annular member 228 and the first mounting plate 186 to mount the first bearing assembly 224 to the first mounting plate 186. The first interior annular member 228 defines a plurality of apertures 238, and the first bearing assembly 224 is positioned such that each one of the apertures 238 of the interior annular member 228 is aligned with a respective one of the apertures 193 of the first mounting plate 186. The second fasteners 236 are disposed through the pairs of aligned apertures 193, 238 to mount the first interior annular member 228 to the first mounting plate 186. It should be appreciated that the first bearing assembly 224 can be mechanically mounted to the first mounting bracket 132 and the first mounting plate 186 in a variety of ways, not limited to using fasteners. Non-mechanical ways of mounting the first bearing assembly 224 to the first mounting bracket 132 and the first mounting plate 186 are also contemplated.

With reference to FIGS. 16-19, the first exterior annular member 226 of the first bearing assembly 224 has an inner surface 240 defining a first exterior member opening 242 with the pivot axis P passing centrally through the first exterior member opening 242. The first exterior annular member 226 further has an outer surface 244 and opposed first 246 and second 248 surfaces. Both the inner surface 240 and the outer surface 244 extend between the first 246 and second 248 surfaces. Both the inner surface 240 and the outer surface 244 have a substantially smooth configuration. In an alternative configuration, the outer surface 244 could have teeth, tabs, or similar features extending from the surface 244 that are configured to mesh with teeth or tabs of a worm or gearing system. The first exterior annular member 226 may have any suitable thickness, and the opposed surfaces 244, 246 may have any suitable width.

The first interior annular member 228 of the first bearing assembly 224 has a peripheral surface 252 and is disposed within the first exterior annular member opening 242 such that the peripheral surface 252 of the first interior annular member 228 faces the inner surface 240 of the first exterior annular member 226. The first interior annular member 228 further has an interior surface 254 defining a first bearing opening 256 with the pivot axis P passing centrally through the first bearing opening 256. The bearing opening 256 has a circular configuration. The first plate opening 221, the second plate opening 223, the first bracket opening 216, the second bracket opening 218, and the bearing opening 256 are aligned with the reinforcing member 214 and the pivot axis P.

Additionally, the first interior annular member 228 has opposing first 258 and second 260 surfaces. Both the peripheral surface 252 and the interior surface 254 extend between the first 258 and second 260 surfaces of the first interior annular member 228 and both have a substantially smooth configuration. In an alternative embodiment, the peripheral surface 252 could have teeth, tabs, or similar features extending from the surface 252 that are configured to mesh with teeth or tabs of a worm or gearing system. The first interior annular member 228 may have any suitable thickness, and the opposed surfaces 258, 260 may have any suitable width.

In the illustrated embodiment, the first 258 and second 260 surfaces of the first interior annular member 228 are offset from the corresponding first 246 and second 248 surfaces of the first exterior annular member 226. When the bearing assembly 224 is mounted to the first mounting bracket 132 and the first mounting plate 186, the offset surfaces 258, 246 and the offset surfaces 260, 248 permit free rotation between the first mounting plate 186 and the first mounting bracket 132. This enables free and relatively smooth side-to-side movement of the boom 110 relative to the frame 106.

Figure 19:
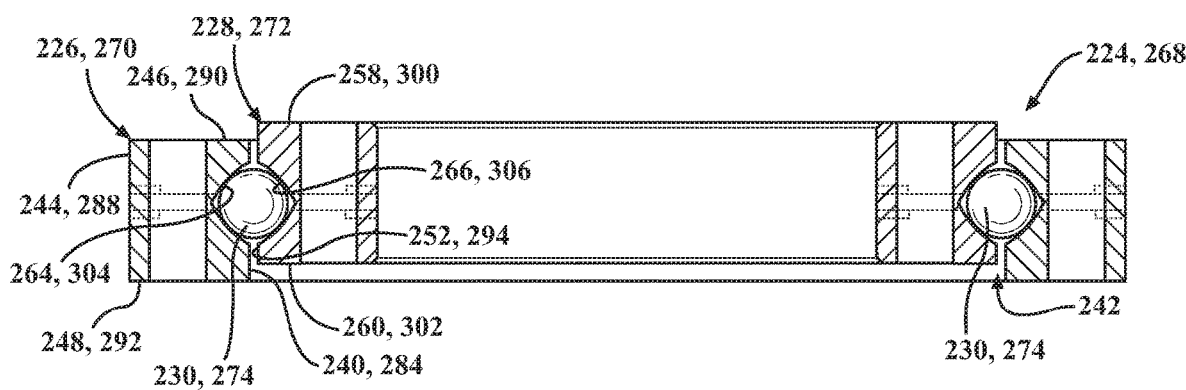
FIG. 19 is a cross-sectional view of the bearing assembly taken along lines 19-19 of FIG. 18.
Figure 20:
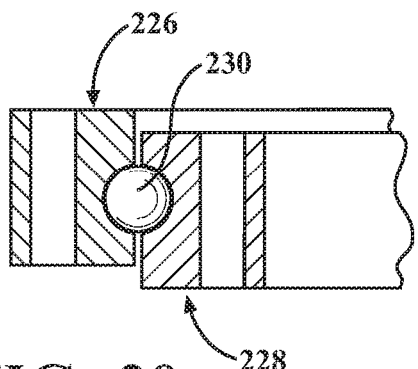
FIGS. 20-25 are cross-sectional views of a portion of various embodiments of the bearing assembly.
Figure 21:
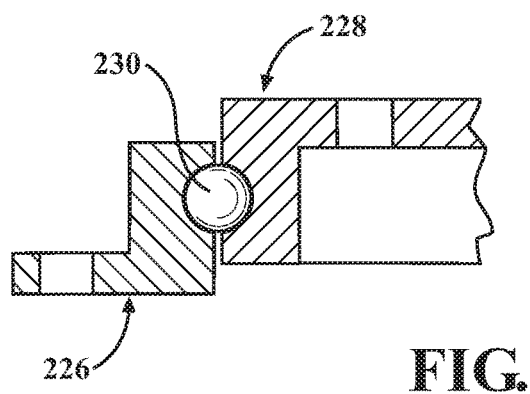

The first bearing assembly 224 further has the rolling element 230 disposed between the inner surface 240 of the first exterior annular member 226 and the peripheral surface 252 of the first interior annular member 228 to permit movement of the first exterior annular member 226 and the first interior annular member 228 relative to one another to facilitate rotation of the first mounting plate 186 relative to the first mounting bracket 132 about the pivot axis P. In an embodiment, and as best shown in FIG. 19, the inner surface 240 of the first exterior annular member 226 defines a first exterior member groove 264 and the peripheral surface 252 of the first interior annular member 228 defines a first interior member groove 266, with the grooves 264, 266 opposite one another. The grooves 264, 266 may have any suitable configuration. The first rolling element 230 is disposed within the opposing grooves 264, 266.

Figure 28:
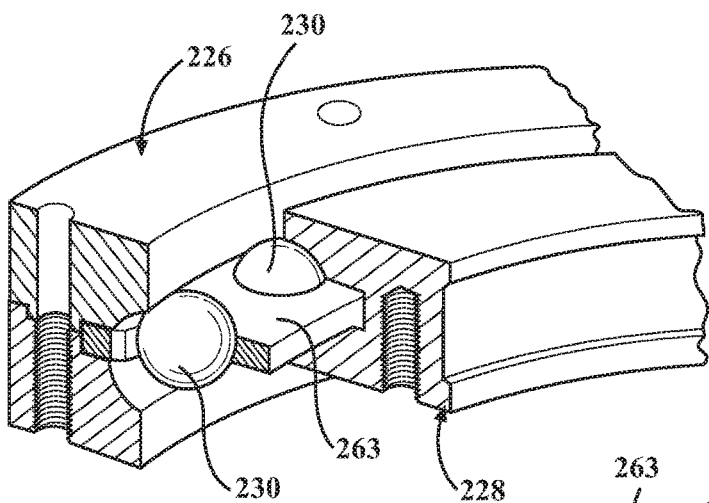

At least a portion of the first rolling element 230 has a rounded configuration, enabling the first rolling element 230 to move (within the grooves 264, 266) between the first exterior annular member 226 and the first interior annular member 228. In various embodiments of the present disclosure shown in FIGS. 20-29, the first rolling element 230 is selected from a ball, a cylinder, and combinations thereof. For example, the embodiments illustrated in FIGS. 20, 21, 34, 34, and 26-28 utilize a ball as the first rolling element 230. The ball is one of a plurality of balls 230 arranged in at least one row. In the embodiments illustrated in FIGS. 20, 21, and 26-28, the first bearing assembly 224 includes a plurality of balls 230 arranged in a single row. In the embodiments illustrated in FIGS. 23 and 24, the first bearing assembly 224 includes a plurality of balls 230 arranged in a plurality of rows. The embodiments shown in FIGS. 23 and 24 include two rows of balls 230. Alternatively, the first bearing assembly 230 could have more than two rows of balls 230. In certain embodiments, as shown in 26 and 27, the first bearing assembly 230 further includes a plurality of spacers 262, with a spacer 262 disposed between each pair of adjacent balls 230. Alternatively, the balls 230 for each row may be supported by a support member 263, as shown in FIGS. 28 and 29.

Figure 22:
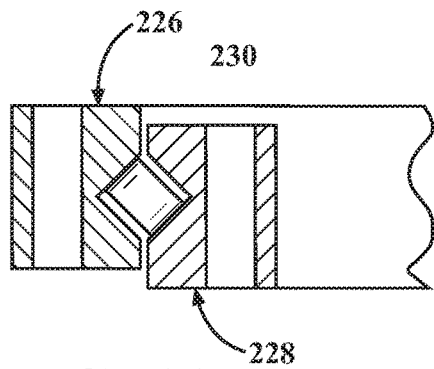
Figure 23:
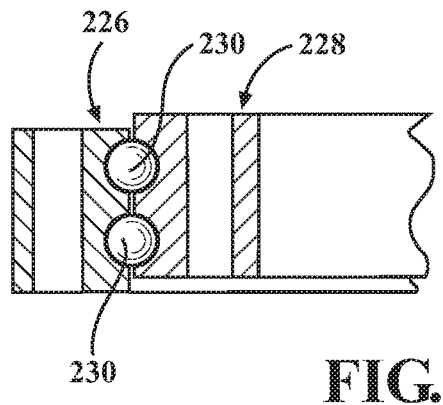
Figure 24:
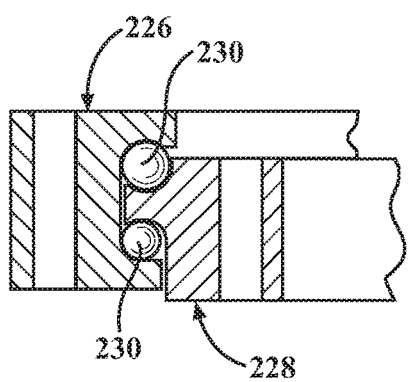
Figure 25:
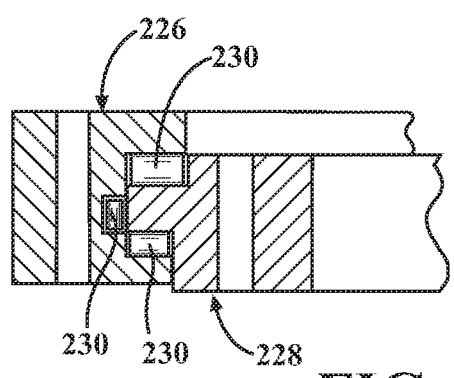
Figure 29:
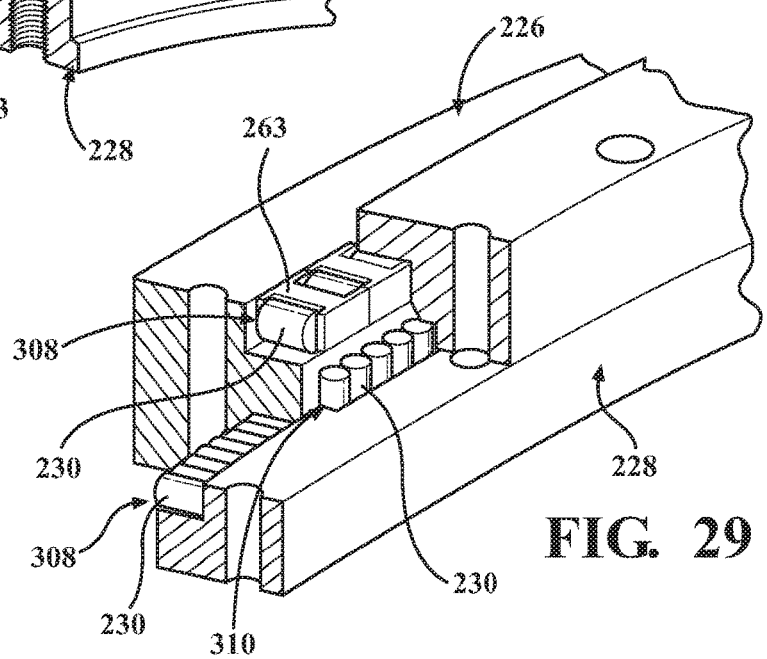

In another embodiment, the first rolling element 230 is a cylinder, which is illustrated in FIGS. 22, 25, and 29. The cylinder 230 may be hollow (defining a true cylinder) or solid (defining a rod). In the illustrated embodiments, the cylinder 230 is one of a plurality of cylinders 230 arranged in at least one row. In the embodiments illustrated in FIG. 22, the first bearing assembly 224 includes a plurality of cylinders 230 arranged in a single row. In the embodiments illustrated in FIGS. 25 and 29, the first bearing assembly 224 includes a plurality of cylinders 230 arranged in a plurality of rows. In these embodiments, the plurality of cylinders 230 is arranged in the plurality of rows alternating between a first arrangement 308 of the plurality of cylinders 230 and a second arrangement 310 of the plurality of cylinders 230 transverse to the first arrangement of the plurality of cylinders 230. As shown, the first bearing assembly 224 has three rows of cylinders 230 with alternating arrangements of cylinders 230.

It should be appreciated that other arrangements or configurations of the first rolling elements 230 are also contemplated. For example, the first bearing assembly 224 could have at least one row of rolling elements 230 including both balls and cylinders. In another example, the first bearing assembly 224 could have at least one row of rolling elements 230 having a rounded configuration other than a ball or a cylinder.

The apparatus 100 further includes the second bearing assembly 268 sandwiched between the second mounting bracket 152 of the frame 106 and the second mounting plate 194 of the first boom segment 170 of the boom 110. The second bearing assembly 268 has a second exterior annular member 270, a second interior annular member 272, and a second rolling element 274 disposed between the exterior 270 and interior 272 annular members. Similar to the first bearing assembly 224, the second bearing assembly 268 may be referred to as a slewing bearing. The second exterior annular member 270 is mounted to one of the second mounting bracket 152 and the second mounting plate 194, and the second interior annular member 272 is mounted to another one of the second mounting bracket 152 and the second mounting plate 194.

In the illustrated embodiment, the second exterior annular member 270 is mounted to the second mounting bracket 152 of the frame 106 and the second interior annular member 272 is mounted to the second mounting plate 194 of the boom 110. The second bearing assembly 268 is mechanically mounted to the second mounting bracket 152 and the second mounting plate 194. For instance, and shown at least in FIG. 4, the apparatus 100 includes a plurality of third fasteners 276 disposed through the second exterior annular member 270 and the second mounting bracket 152 to mount the second bearing assembly 268 to the second mounting bracket 152. The second exterior annular member 270 defines a plurality of apertures 278, and the second bearing assembly 268 is positioned such that each one of the apertures 278 of the second exterior annular member 270 is aligned with a respective one of the apertures 153 of the second mounting bracket 152. The third fasteners 276 are disposed through the pairs of aligned apertures 153, 278 to mount the second exterior annular member 270 to the second mounting bracket 152.

The apparatus 100 also includes a plurality of fourth fasteners 280 disposed through the second interior annular member 272 and the second mounting plate 194 to mount the second bearing assembly 268 to the second mounting plate 194. The second interior annular member 272 defines a plurality of apertures 282, and the second bearing assembly 268 is positioned such that each one of the apertures 282 of the interior annular member 272 is aligned with a respective one of the apertures 201 of the second mounting plate 194. The fourth fasteners 280 are disposed through the pairs of aligned apertures 201, 282 to mount the second interior annular member 272 to the second mounting plate 194. It should be appreciated that the second bearing assembly 268 can be mechanically mounted to the second mounting bracket 152 and the second mounting plate 194 in a variety of ways, not limited to using fasteners. Non-mechanical ways of mounting the second bearing assembly 268 to the second mounting bracket 152 and the second mounting plate 194 are also contemplated.

The second exterior annular member 270 of the second bearing assembly 268 has an inner surface 284 defining a second exterior member opening 286 with the pivot axis P passing centrally through the second exterior member opening 286. The second exterior annular member 270 further has an outer surface 288 and opposed first 290 and second 292 surfaces. Both the inner surface 284 and the outer surface 288 extend between the first 290 and second 292 surfaces and have a substantially smooth configuration. In an alternative embodiment, the outer surface 288 could have teeth, tabs, or similar features extending from the surface 288 configured to mesh with teeth or tabs of a worm or gearing system. The second exterior annular member 270 may have any suitable thickness, and the opposed surfaces 290, 292 may have any suitable width.

The second interior annular member 272 of the second bearing assembly 268 has a peripheral surface 294. The second interior annular member 272 is disposed within the second exterior annular member opening 286 such that the peripheral surface 294 of the second interior annular member 272 faces the inner surface 284 of the second exterior annular member 270. The second interior annular member 272 further has an interior surface 296 defining a second bearing opening 298 with the pivot axis P passing centrally through the second bearing opening 298. Additionally, the second interior annular member 272 has opposing first 300 and second 302 surfaces. Both the peripheral surface 294 and the interior surface 296 extend between the first 300 and second 302 surfaces of the second interior annular member 272 and both have a substantially smooth configuration. In an alternative embodiment, the peripheral surface 294 could have teeth, tabs, or similar features extending from the surface 294 configured to mesh with teeth or tabs of a worm or gearing system. The second interior annular member 272 may have any suitable thickness, and the opposed surfaces 300, 302 may have any suitable width.

In the illustrated embodiment, the first 300 and second 302 surfaces of the second interior annular member 272 are offset from the corresponding first 290 and second 292 surfaces of the second exterior annular member 270. The offset surfaces 290, 300 and the offset surfaces 292, 302 permits free rotation between the second mounting plate 194 and the second mounting bracket 152. This enables free and relatively smooth side-to-side movement of the boom 110 relative to the frame 106.

The second bearing assembly 268 further has the rolling element 274 disposed between the inner surface 284 of the second exterior annular member 270 and the peripheral surface 294 of the second interior annular member 272 to permit movement of the second exterior annular member 270 and the second interior annular member 272 relative to one another to facilitate rotation of the second mounting plate 194 relative to the second mounting bracket 152 about the pivot axis P. In an embodiment, and as best shown in FIG. 19, the inner surface 284 of the second exterior annular member 270 defines a second exterior member groove 304 and the peripheral surface 294 of the second interior annular member 272 defines a second interior member groove 306, with the grooves 304, 306 opposite one another. The second rolling element 274 is disposed within the opposing grooves 304, 306.

Details of the second rolling element 274 are the same as previously described for the first rolling element 230 with reference to FIGS. 20-29. In brief, and similar to the first rolling element 230, at least a portion of the second rolling element 274 has a rounded configuration, enabling the second rolling element 274 to move (within the grooves 304, 306) between the second exterior annular member 270 and the second interior annular member 272. In various embodiments of the present disclosure, the second rolling element 274 is selected from a ball, a cylinder, and combinations thereof. Additionally, the second rolling element 274 is one of a plurality of rolling elements 274 arranged in at least one row, such as a single row, two rows, etc. In instances where the second bearing assembly 268 has a plurality of cylinders 274, the cylinders 274 may be arranged in a plurality of rows alternating between the first arrangement 308 of cylinders and the second arrangement 310 of cylinders transverse to the first arrangement 308 of cylinders, as previously described. It should be appreciated that other arrangements or configurations of the second rolling elements 274 are also contemplated, such as arrangements having at least one row of balls and cylinders or rolling elements 274 having a rounded configuration other than a ball or cylinder.

To improve performance and longevity, the first 224 and second 268 bearing assemblies is lubricated utilizing a suitable lubricant or grease. For example, the apparatus 100 includes a remote grease mount including a bearing grease fitting 315 coupled to the first bearing assemblies 224 for receiving the lubricant. Although not shown, the apparatus 100 includes a grease line from the fitting 315 to the first 224 and second 268 bearing assemblies for delivering the lubricant to the bearing assemblies 224, 268. This arrangement simplifies lubrication of the bearing assemblies 224, 268, particularly of the second bearing assembly 268 which can be difficult to access.

Figure 26:
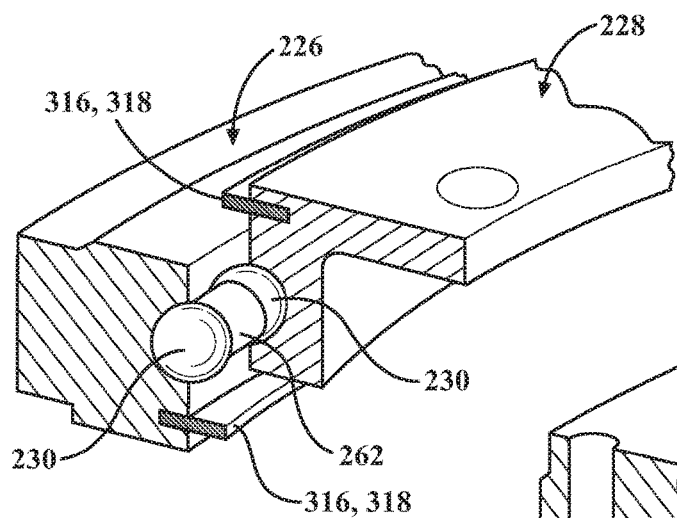
FIGS. 26-29 are cross-sectional perspective views of a portion of various embodiments of the bearing assembly.
Figure 27:
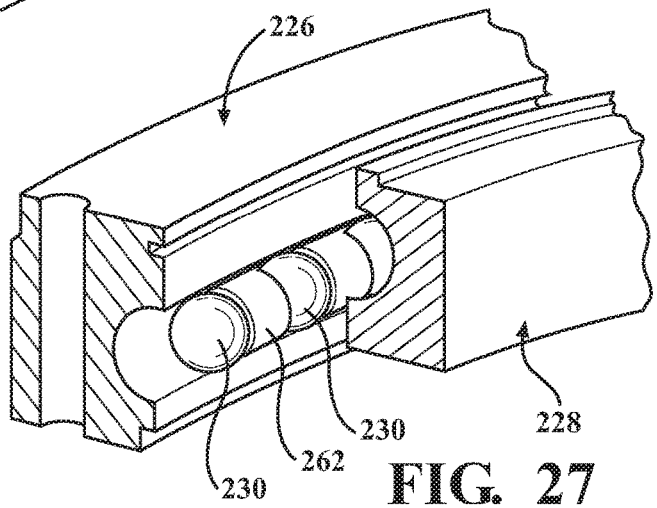

In an embodiment, and as shown in FIG. 26, the first bearing assembly 224 further has a first seal 316 disposed between the first exterior annular member 226 and the first interior annular member 228, and the second bearing assembly 268 further has a second seal 318 disposed between the second exterior annular member 270 and the second interior annular member 272. The seals 316, 318 could be disposed within channels defined in the inner surface 240 of the first exterior annular member 226 and/or peripheral surface 252 of the first interior annular member 228. The seals 316, 318 may be formed from any suitable sealing material, such as a rubber, and operate to keep the lubricant within the bearing assembly 224, 268 and contaminants out of the bearing assembly 224, 268.

The first 224 and second 268 bearing assemblies operate in unison to permit free pivotal movement of the boom 110 relative to the frame 106. The boom 110 can freely pivot to one side until the boom 110 interacts (such as contacts) the stops 144, 162 of the first 132 and second 152 mounting brackets, which prevents the boom 110 from moving further in this direction. The boom 110 can also freely pivot to the other side until the boom 110 interacts (such as contacts) the stops 148, 166 of the first 132 and second 152 mounting brackets, which prevents the boom 110 from moving further in this other direction. Additionally, the pivotal movement of the boom 110 remains unobstructed throughout this range of pivotal movement by virtue of the rounded sections 150, 168 of the mounting brackets 132, 152 and the rounded sections 192, 200 of the mounting plates 186, 194. Additionally, the boom 110 can be easily removed from the frame 106 by simply removing the fasteners 232, 236, 276, 280 to disassemble the bearing assemblies 224, 268 and/or unmount the bearing assemblies 224, 268 from the frame 106 and the boom 110.

Another embodiment of the apparatus 500 is shown in FIGS. 30-41. The apparatus 500 is essentially the same as the apparatus 100 described in detail above aside from various features of the frame 106 and the first boom segment 170 of the boom 110. The differences will be evident in light of the description set forth below.

Similar to the apparatus 100, the apparatus 500 includes the lift mechanism 502 adapted to be mounted to the vehicle 10 such that the lift mechanism 502 is movable with the body 12 of the vehicle 10. The apparatus 100 further includes the frame 506 mounted to the lift mechanism 102, the boom 510 coupled to the frame 506, and the cutting device 512 mounted to the boom 510. The lift mechanism 502 is configured to move the frame 506 (with the boom 510 and the cutting device 512) upwards and downwards, such as during a grinding/cutting operation. Details of the lift mechanism 502 are the same as previously described for the lift mechanism 102 of the apparatus 100.

The frame 506 is described with reference to FIGS. 32-38. The frame 506 is mounted to the lift mechanism 502 utilizing at least one fastening device 524 adapted to mate with an attachment plate 508 of the lift mechanism 502, as similarly described for the apparatus 100. The frame 506 further has at least one support bracket 531 supporting an adjustable stand 534, at least one cylinder bracket 527, and at least one hydraulic cylinder 529 pivotally coupled to the at least one cylinder bracket 527, as also similarly described for the apparatus 100. The frame 506 further has. As best shown in FIGS. 32, 33, 35, and 37, the frame 506 of the apparatus 500 has at least one pair of cylinder brackets 527, with each pair of cylinder brackets 527 pivotally coupling a single hydraulic cylinder 529 to the frame 506.

The frame 506 further has the first 532 and second 552 mounting brackets. The first mounting bracket 532 has the first mounting portion 536, opposing first 538 and third 540 support legs extending from the first mounting portion 536, the first tab 542 disposed and transitioning between the first mounting portion 536 and the first support leg 540, and the third tab 546 disposed and transitioning between the first mounting portion 536 and the third support leg 540. The first tab 542 defines the first stop 544, and the third tab 546 defines the third stop 548. The first mounting bracket 532 further has a rounded section 550 defining a range of pivotal movement of the boom 510 relative to the frame 506. Additionally, the first mounting bracket 532 defines the first bracket opening 616. Notably, the first bracket opening 616 of the first mounting bracket 532 of the apparatus 500 is larger than the first bracket opening 216 of the first mounting bracket 132 of the apparatus 100.

The second mounting bracket 552 has the second mounting portion 554, opposing second 556 and fourth 558 support legs extending from the second mounting portion 554, the second tab 560 disposed and transitioning between the second mounting portion 554 and the second support leg 556, and the fourth tab 564 disposed and transitioning between the second mounting portion 554 and the fourth support leg 558. The second tab 560 defines the second stop 562, and the fourth tab 564 defines the fourth stop 566. The second mounting bracket 552 further has a rounded section 568 defining a range of pivotal movement of the boom 510 relative to the frame 506. Additionally, the second mounting bracket 552 defines the second bracket opening 618. Notably, the second bracket opening 618 of the second mounting bracket 552 of the apparatus 500 is larger than the second bracket opening 218 of the second mounting bracket 152 of the apparatus 100.

The apparatus 500 further has the boom 510, which is configured essentially the same as the boom 110 of the apparatus 100 and includes the first 570 and second 572 boom segments. The first boom segment 570 is coupled to the frame 506 and pivotal about the pivot axis P, and the second boom segment 572 extends from the first boom segment 570. The second boom segment 572 is the same as the second boom segment 172 as previously described. The first boom segment 570 includes the first 586 and second 594 mounting plates. The first mounting plate 586 has the same configuration as the first mounting plate 186 of the apparatus 100 except that the first plate opening 621 of the first mounting plate 586 of the apparatus 500 is larger than the first plate opening 221 of the first mounting plate 186 of the apparatus 100. Similarly, the second mounting plate 594 has the same configuration as the second mounting plate 194 of the apparatus 100 except that the second plate opening 623 of the second mounting plate 594 of the apparatus 500 is larger than the second plate opening 223 of the second mounting plate 194 of the apparatus 100.

The apparatus 500 further includes the reinforcing member 614 extending between the first 586 and second 594 mounting plates of the first boom segment 570 to support the boom 510 coupled to the frame 506. The reinforcing member 614 has the same configuration as the reinforcing member 214 of the apparatus 100 except that the reinforcing member 614 of the apparatus 500 is larger in diameter or width. The reinforcing member 614 may be coupled to the mounting brackets 532, 552, such as with one or more welds as previously described.

The apparatus 500 further includes the first 624 and second 668 bearing assemblies, with the first bearing assembly 624 sandwiched between the first mounting bracket 532 and the first mounting plate 586 and the second bearing assembly 668 sandwiched between the second mounting bracket 552 and the second mounting plate 594. The bearing assemblies 624, 668 have the same configuration and are mounted to the respective mounting brackets 532, 552 and the respective mounting plates 586, 594 is the same fashion as the bearing assemblies 224, 268 are mounted to the respective mounting brackets 132, 152 and the respective mounting plates 186, 194 of the apparatus 100.

The apparatus 500 operates in the same manner as the apparatus 100 for cutting/grinding plant material in the ground. The bearing assemblies 624, 668 permit free pivotal movement of the boom 510 relative to the frame 506. Additionally, the pivotal movement of the boom 510 remains unobstructed throughout the range of pivotal movement by virtue of respective configurations the mounting brackets 532, 552 and the mounting plates 586, 594. Additionally, the boom 510 can be easily removed from the frame 506 by simple disassembly of the bearing assemblies 224, 268 from the frame 506 and the boom 510.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

What is claimed is:

1. An apparatus for use with a vehicle to reduce plant material, said apparatus comprising:
    a frame having first and second mounting brackets extending from said frame and spaced from one another with said first and second mounting brackets collectively defining a pivot axis with said frame adapted to be coupled to the vehicle;
    a boom having first and second boom segments with said first boom segment coupled to said frame and pivotal about said pivot axis, and said first boom segment having first and second mounting plates with said first mounting plate positioned adjacent but spaced from said first mounting bracket and said second mounting plate positioned adjacent but spaced from said second mounting bracket;
    a drive assembly coupled to said second boom segment and having a drive shaft rotatably mounted to said second boom segment;
    a cutting device mounted to said drive shaft and rotatable with said drive shaft for reducing the plant material as said cutting device contacts the plant material;
    a reinforcing member extending between said first and second mounting brackets to support said boom coupled to said frame;
    a first bearing assembly sandwiched between said first mounting bracket and said first mounting plate with said first bearing assembly having:
        a first exterior annular member mounted to one of said first mounting bracket and said first mounting plate with said first exterior annular member having an inner surface defining a first exterior member opening with said pivot axis passing centrally through said first exterior member opening,
        a first interior annular member mounted to another one of said first mounting bracket and said first mounting plate with said first interior annular member having a peripheral surface facing said inner surface of said first exterior annular member, and
        a first rolling element disposed between said inner surface of said first exterior annular member and said peripheral surface of said first interior annular member to permit movement of said first exterior annular member and said first interior annular member relative to one another to facilitate rotation of said first mounting plate relative to said first mounting bracket about said pivot axis;
    a plurality of first fasteners disposed through said first exterior annular member and said first mounting bracket to mount said first bearing assembly to said first mounting bracket;
    a plurality of second fasteners disposed through said first interior annular member and said first mounting plate to mount said first bearing assembly to said first mounting plate;
    a second bearing assembly sandwiched between said second mounting bracket and said second mounting plate with said second bearing assembly having:
        a second exterior annular member mounted to one of said second mounting bracket and said second mounting plate with said second exterior annular member having an inner surface defining a second exterior member opening with said pivot axis passing centrally through said second exterior member opening,
- a second interior annular member mounted to another one of said second mounting bracket and said second mounting plate with said second interior annular member having a peripheral surface facing said inner surface of said second exterior annular member, and
- a second rolling element disposed between said inner surface of said second exterior annular member and said peripheral surface of said second interior annular member to permit movement of said second exterior annular member and said second interior annular member relative to one another to facilitate rotation of said second mounting plate relative to said second mounting bracket about said pivot axis to permit said pivotal movement of said boom relative to said frame about said pivot axis;
- a plurality of third fasteners disposed through said second exterior annular member and said second mounting bracket to mount said second bearing assembly to said second mounting bracket; and
- a plurality of fourth fasteners disposed through said first interior annular member and said second mounting plate to mount said second bearing assembly to said second mounting plate.

2. The apparatus as set forth in claim 1 further comprising a lift mechanism adapted to be mounted to the vehicle with said frame mounted to said lift mechanism, wherein said lift mechanism is configured to move said frame upwards and downwards.

3. The apparatus as set forth in claim 2 wherein said lift mechanism includes a base adapted to be mounted to the vehicle and fixed in relation to the vehicle and said lift mechanism further includes at least one hydraulic actuator mounted to said base and said frame and configured to generate a hydraulic force to move said frame upwards and downwards.

4. The apparatus as set forth in claim 1 wherein said first exterior annular member of said first bearing assembly is mounted to said first mounting bracket of said frame and said first interior annular member of said first bearing assembly is mounted to said first mounting plate of said boom, and
- said second exterior annular member of said second bearing assembly is mounted to said second mounting bracket of said frame and said second interior annular member of said second bearing assembly is mounted to said second mounting plate of said boom.

5. The apparatus as set forth in claim 1 wherein said first exterior annular member has opposing first and second surfaces with said inner surface of said first exterior annular member extending between said first and second surfaces of said first exterior annular member and said first interior annular member has opposing first and second surfaces with said peripheral surface of said first interior annular member extending between said first and second surfaces of said first interior annular member with said first and second surfaces of said first interior annular member being offset from said corresponding first and second surfaces of said first exterior annular member to permit free rotation between of said first mounting plate relative to said first mounting bracket, and
- said second exterior annular member has opposing first and second surfaces with said inner surface of said second exterior annular member extending between said first and second surfaces of said second exterior annular member and said second interior annular member has opposing first and second surfaces with said peripheral surface of said second interior annular member extending between said first and second surfaces of said second interior annular member with said first and second surfaces of said second interior annular member being offset from said corresponding first and second surfaces of said second exterior annular member to permit free rotation between of said second mounting plate relative to said second mounting bracket.

6. The apparatus as set forth in claim 1 wherein each of said first and second rolling elements is selected from a ball, a cylinder, and combinations thereof.

7. The apparatus as set forth in claim 1 wherein said first rolling element of said first bearing assembly is one of a plurality of first rolling elements arranged in at least one row with said plurality of first rolling elements selected from a plurality of first balls, a plurality of first cylinders, and combinations thereof, and said second rolling element of said second bearing assembly is one of a plurality of second rolling elements arranged in at least one row with said plurality of second rolling elements selected from a plurality of second balls, a plurality of second cylinders, and combinations thereof.

8. The apparatus as set forth in claim 1 wherein said first rolling element of said first bearing assembly is further defined as a cylinder with said cylinder of said first bearing assembly being one of a plurality of cylinders arranged in a plurality of rows alternating between a first arrangement of said plurality of cylinders and a second arrangement of said plurality of cylinders transverse to said first arrangement of said plurality of cylinders, and
- said second rolling element of said second bearing assembly is further defined as a cylinder with said cylinder of said second bearing assembly being one of a plurality of cylinders arranged in a plurality of rows alternating between a first arrangement of said plurality of cylinders and a second arrangement of said plurality of cylinders transverse to said first arrangement of said plurality of cylinders.

9. The apparatus as set forth in claim 1 wherein said first bearing assembly further has a first seal disposed between said first exterior annular member and said first interior annular member, and
- said second bearing assembly further has a second seal disposed between said second exterior annular member and said second interior annular member.

10. The apparatus as set forth in claim 1 wherein said first mounting bracket has a first mounting portion and a first support leg extending from said first mounting portion, with said first bearing assembly sandwiched between said first mounting portion of said first mounting bracket and said first mounting plate, and
- said second mounting bracket has a second mounting portion and a second support leg extending from said second mounting portion, with said second bearing assembly sandwiched between said second mounting portion of said second mounting bracket and said second mounting plate.

11. The apparatus as set forth in claim 10 wherein said first mounting bracket has a first tab disposed and transitioning between said first mounting portion and said first support leg with said first tab defining a stop and said second mounting bracket has a second tab disposed and transitioning between said second mounting portion adjacent said second support leg with said second tab defining a stop, wherein said first and second stops interact with said first boom segment to limit said pivotal movement of said boom relative to said frame about said pivot axis.

12. The apparatus as set forth in claim 11 wherein said first tab is aligned with said second tab along said pivot axis.

13. The apparatus as set forth in claim 1 wherein said first mounting bracket has a first tab defining a first stop and said second mounting bracket has a second tab defining a second stop, with said first and second stops interacting with said first boom segment to limit said pivotal movement of said boom relative to said frame about said pivot axis.

14. The apparatus as set forth in claim 13 wherein said first boom segment further has a support plate extending between said first and second mounting plates with said first and second stops interacting with said support plate to limit said pivotal movement of said boom relative to said frame about said pivot axis.

15. The apparatus as set forth in claim 14 wherein said support plate defines first and second notches with said first tab disposed within said first notch and said first stop contacting said support plate and said second tab disposed within said second notch and said second stop contacting said support plate to limit said pivotal movement of said boom relative to said frame.

16. The apparatus as set forth in claim 15 wherein said first notch has a first depth and said second notch has a second depth substantially the same as said first depth.

17. The apparatus as set forth in claim 1 wherein said first mounting bracket has a first mounting portion, opposing first and third support legs extending from said first mounting portion with each of said first mounting portion, said first support leg, and said third support leg abutting said frame, and said first mounting bracket further having a first tab disposed and transitioning between said first mounting portion and said first support leg with said first tab defining a first stop and a third tab disposed and transitioning between said first mounting portion and said third support leg with said third tab defining a third stop, and said second mounting bracket has a second mounting portion, opposing second and fourth support legs extending from said second mounting portion with each of said second mounting portion, said second support leg, and said fourth support leg abutting said frame, and said second mounting bracket further has a second tab disposed and transitioning between said second mounting portion and second support leg with said second tab defining a second stop and a fourth tab disposed and transitioning between said second mounting portion and said fourth support leg with said fourth tab defining a fourth stop.

18. The apparatus as set forth in claim 17 wherein said first boom segment further has a first support plate extending between said first and second mounting plates with said first support plate defining first and second notches with said first tab disposed within said first notch and said first stop contacting said first support plate and said second tab disposed within said second notch and said second stop contacting said first support plate to limit said pivotal movement of said boom relative to said frame, and said first boom segment further has a second support plate extending between said first and second mounting plates with said second support plate defining third and fourth notches with said third tab disposed within said third notch and said third stop contacting said second support plate and said fourth tab disposed within said fourth notch and said fourth stop contacting said second support plate to limit said pivotal movement of said boom relative to said frame.

19. The apparatus as set forth in claim 17 wherein said first mounting bracket has a first rounded section disposed between said first and third tabs and said second mounting bracket has a second rounded section disposed between said second and fourth tabs with each of said first and second rounded sections defining a range of said pivotal movement of said boom relative to said frame.

20. The apparatus as set forth in claim 1 wherein said first mounting bracket defines a first bracket opening and said second mounting bracket defines a second bracket opening, each of said first and second interior annular members has an inner surface defining a bearing opening, and said first mounting plate defines a first plate opening and said second mounting plate defines a second plate opening, with said first bracket opening, said second bracket opening, said bearing opening of said first interior annular member, said bearing opening of said second interior annular member, said first plate opening, and said second plate opening aligned with said reinforcing member and said pivot axis.

21. The apparatus as set forth in claim 18 wherein each of said first bracket opening, said second bracket opening, said bearing opening of said first interior annular member, said bearing opening of said second interior annular member, said first plate opening, and said second plate opening has a circular configuration, and said reinforcing member has a cylindrical configuration.

22. An apparatus for use with a vehicle to reduce plant material, said apparatus comprising:

a frame having a mounting bracket extending from said frame with said mounting bracket defining a pivot axis with said frame adapted to be coupled to the vehicle;

a boom having first and second boom segments with said first boom segment coupled to said frame and pivotal about said pivot axis, and said first boom segment having a mounting plate positioned adjacent but spaced from said mounting bracket;

a drive assembly coupled to said second boom segment and having a drive shaft rotatably mounted to said second boom segment;

a cutting device mounted to said drive shaft and rotatable with said drive shaft for reducing the plant material as said cutting device contacts the plant material; and a bearing assembly sandwiched between said mounting bracket and said mounting plate with said bearing assembly having:

an exterior annular member mounted to one of said mounting bracket and said mounting plate with said exterior annular member having an inner surface defining an exterior member opening with said pivot axis passing centrally through said exterior member opening, an interior annular member mounted to another one of said mounting bracket and said mounting plate with said interior annular member having a peripheral surface facing said inner surface of said first exterior annular member, and a rolling element disposed between said inner surface of said exterior annular member and said peripheral surface of said interior annular member to permit movement of said exterior annular member and said interior annular member relative to one another to facilitate rotation of said mounting plate relative to said mounting bracket about said pivot axis to permit said pivotal movement of said boom relative to said frame about said pivot axis;

a plurality of first fasteners disposed through said exterior annular member and said mounting bracket to mount said bearing assembly to said mounting bracket;

a plurality of second fasteners disposed through said interior annular member and said mounting plate to mount said bearing assembly to said mounting plate.

23. The apparatus as set forth in claim 22 further comprising a lift mechanism adapted to be mounted to the vehicle with said frame mounted to said lift mechanism, wherein said lift mechanism is configured to move said frame upwards and downwards.

24. The apparatus as set forth in claim 22 wherein said exterior annular member of said bearing assembly is mounted to said mounting bracket of said frame and said interior annular member of said bearing assembly is mounted to said mounting plate of said boom.

25. The apparatus as set forth in claim 24 wherein said exterior annular member has opposing first and second surfaces with said inner surface of said exterior annular member extending between said first and second surfaces of said exterior annular member and said interior annular member has opposing first and second surfaces with said peripheral surface of said interior annular member extending between said first and second surfaces of said interior annular member with said first and second surfaces of said interior annular member being offset from said corresponding first and second surfaces of said exterior annular member to permit free rotation between of said mounting plate relative to said mounting bracket.

26. The apparatus as set forth in claim 22 wherein said rolling element is selected from a ball, a cylinder, and combinations thereof.

27. The apparatus as set forth in claim 22 wherein said mounting bracket has a mounting portion and opposing first and third support legs extending from said mounting portion with said mounting portion, said first support leg, and said third support leg abutting said frame and said bearing assembly sandwiched between said mounting portion of said mounting bracket and said mounting plate, and said mounting bracket further has a first tab disposed and transitioning between said mounting portion and said first support leg with said first tab defining a first stop and a third tab disposed and transitioning between said mounting portion and said third support leg with said third tab defining a third stop.

28. The apparatus as set forth in claim 27 wherein said first boom segment further has a first support plate extending from said mounting plate with said first support plate defining a first notch with said first tab disposed within said first notch and said first stop contacting said first support plate to limit said pivotal movement of said boom relative to said frame; and said first boom segment further has a second support plate extending from said mounting plate with said second support plate defining a third notch with said third tab disposed within said third notch and said third stop contacting said second support plate to limit said pivotal movement of said boom relative to said frame.

29. The apparatus as set forth in claim 27 wherein said mounting bracket has a rounded section disposed between said first and third tabs with said rounded section defining a range of said pivotal movement of said boom relative to said frame.

* * * * *